United States Patent
Nanba et al.

(10) Patent No.: US 9,490,472 B2
(45) Date of Patent: Nov. 8, 2016

(54) METHOD FOR MANUFACTURING ELECTRODE FOR STORAGE BATTERY

(71) Applicant: SEMICONDUCTOR ENERGY LABORATORY CO., LTD., Atsugi-shi, Kanagawa-ken (JP)

(72) Inventors: Kenryo Nanba, Tokyo (JP); Mikio Yukawa, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 414 days.

(21) Appl. No.: 14/220,310

(22) Filed: Mar. 20, 2014

(65) Prior Publication Data

US 2014/0295068 A1    Oct. 2, 2014

(30) Foreign Application Priority Data

Mar. 28, 2013   (JP) .................................. 2013-068003

(51) Int. Cl.
| | |
|---|---|
| *H01M 4/04* | (2006.01) |
| *B05D 5/12* | (2006.01) |
| *H01M 4/139* | (2010.01) |
| *H01M 4/62* | (2006.01) |

(52) U.S. Cl.
CPC ........... *H01M 4/0404* (2013.01); *H01M 4/049* (2013.01); *H01M 4/0435* (2013.01); *H01M 4/139* (2013.01); *H01M 4/625* (2013.01); *Y02E 60/122* (2013.01); *Y02P 70/54* (2015.11)

(58) Field of Classification Search
CPC ........... H04M 4/0404; H04M 4/0435; H04M 4/049; H04M 4/625
USPC .................................. 427/58; 429/209, 218.1
See application file for complete search history.

(56) References Cited

U.S. PATENT DOCUMENTS

| | | | |
|---|---|---|---|
| 2,906,803 A | * | 9/1959 | Brown .................... H01M 4/04 419/2 |
| 4,302,518 A | | 11/1981 | Goodenough et al. |
| 4,668,595 A | | 5/1987 | Yoshino et al. |

(Continued)

FOREIGN PATENT DOCUMENTS

| | | |
|---|---|---|
| CN | 101562248 | 10/2009 |
| JP | 08-037007 A | 2/1996 |

(Continued)

OTHER PUBLICATIONS

A. Padhi et al., "Phospho-olivines as Positive-Electrode Materials for Rechargeable Lithium Batteries", *J. Electrochem. Soc.*, 1997, vol. 144, No. 4, pp. 1188-1194.

(Continued)

*Primary Examiner* — Cachet Sellman
(74) *Attorney, Agent, or Firm* — Nixon Peabody LLP; Jeffrey L. Costellia

(57) ABSTRACT

To provide a storage battery electrode including an active material layer with high density that contains a smaller percentage of conductive additive. To provide a storage battery having a higher capacity per unit volume of an electrode with the use of the electrode for a storage battery. A slurry that contains an active material and graphene oxide is applied to a current collector and dried to form an active material layer over the current collector, the active material layer over the current collector is rolled up together with a spacer, and a rolled electrode which includes the spacer are immersed in a reducing solution so that graphene oxide is reduced.

21 Claims, 12 Drawing Sheets

(56) References Cited

U.S. PATENT DOCUMENTS

| | | | |
|---|---|---|---|
| 5,585,142 A * | 12/1996 | Klein | H01M 4/0435 |
| | | | 29/623.5 |
| 5,783,333 A | 7/1998 | Mayer | |
| 5,871,866 A | 2/1999 | Barker et al. | |
| 5,910,382 A | 6/1999 | Goodenough et al. | |
| 6,085,015 A | 7/2000 | Armand et al. | |
| 6,233,135 B1 * | 5/2001 | Farahmandi | H01G 9/038 |
| | | | 361/502 |
| 6,514,640 B1 | 2/2003 | Armand et al. | |
| 7,179,561 B2 | 2/2007 | Niu et al. | |
| 7,572,542 B2 | 8/2009 | Naoi | |
| 7,658,901 B2 | 2/2010 | Prud'Homme et al. | |
| 7,745,047 B2 | 6/2010 | Zhamu et al. | |
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,278,011 B2 | 10/2012 | Zhu et al. | |
| 8,317,984 B2 | 11/2012 | Gilje | |
| 8,691,450 B1 * | 4/2014 | Srinivasan | H01M 6/40 |
| | | | 429/218.1 |
| 2001/0010807 A1 | 8/2001 | Matsubara | |
| 2002/0009642 A1 * | 1/2002 | Funabiki | C01G 49/00 |
| | | | 429/221 |
| 2002/0102459 A1 | 8/2002 | Hosoya et al. | |
| 2002/0195591 A1 | 12/2002 | Ravet et al. | |
| 2003/0086238 A1 * | 5/2003 | Bendale | H01G 9/155 |
| | | | 361/502 |
| 2005/0072514 A1 * | 4/2005 | Yan | H01M 4/881 |
| | | | 156/230 |
| 2006/0040182 A1 * | 2/2006 | Kawakami | H01M 4/38 |
| | | | 429/218.1 |
| 2006/0051671 A1 | 3/2006 | Thackeray et al. | |
| 2007/0009799 A1 | 1/2007 | Zheng | |
| 2007/0131915 A1 | 6/2007 | Stankovich et al. | |
| 2008/0048153 A1 | 2/2008 | Naoi | |
| 2008/0254296 A1 | 10/2008 | Handa et al. | |
| 2009/0110627 A1 | 4/2009 | Choi et al. | |
| 2009/0117467 A1 | 5/2009 | Zhamu et al. | |
| 2009/0123850 A1 | 5/2009 | Takeuchi et al. | |
| 2009/0202915 A1 | 8/2009 | Modeki et al. | |
| 2009/0253045 A1 | 10/2009 | Kotato et al. | |
| 2009/0305135 A1 | 12/2009 | Shi et al. | |
| 2010/0035093 A1 | 2/2010 | Ruoff et al. | |
| 2010/0055025 A1 | 3/2010 | Jang et al. | |
| 2010/0081057 A1 | 4/2010 | Liu et al. | |
| 2010/0105834 A1 | 4/2010 | Tour et al. | |
| 2010/0143798 A1 | 6/2010 | Zhamu et al. | |
| 2010/0176337 A1 | 7/2010 | Zhamu et al. | |
| 2010/0233538 A1 | 9/2010 | Nesper et al. | |
| 2010/0233546 A1 | 9/2010 | Nesper et al. | |
| 2010/0248034 A1 | 9/2010 | Oki et al. | |
| 2010/0301279 A1 | 12/2010 | Nesper et al. | |
| 2010/0303706 A1 | 12/2010 | Wallace et al. | |
| 2010/0308277 A1 | 12/2010 | Grupp et al. | |
| 2010/0330421 A1 | 12/2010 | Cui et al. | |
| 2011/0012067 A1 | 1/2011 | Kay | |
| 2011/0111303 A1 | 5/2011 | Kung et al. | |
| 2011/0121240 A1 * | 5/2011 | Amine | H01M 4/0402 |
| | | | 252/502 |
| 2011/0136019 A1 | 6/2011 | Amiruddin et al. | |
| 2011/0159372 A1 | 6/2011 | Zhamu et al. | |
| 2011/0227000 A1 | 9/2011 | Ruoff et al. | |
| 2011/0229795 A1 | 9/2011 | Niu et al. | |
| 2012/0045692 A1 | 2/2012 | Takemura et al. | |
| 2012/0058397 A1 | 3/2012 | Zhamu et al. | |
| 2012/0064409 A1 | 3/2012 | Zhamu et al. | |
| 2012/0088151 A1 | 4/2012 | Yamazaki et al. | |
| 2012/0088156 A1 | 4/2012 | Nomoto et al. | |
| 2012/0100402 A1 | 4/2012 | Nesper et al. | |
| 2012/0308884 A1 | 12/2012 | Oguni et al. | |
| 2012/0308891 A1 | 12/2012 | Todoriki et al. | |
| 2012/0315550 A1 | 12/2012 | Liu et al. | |
| 2013/0045156 A1 | 2/2013 | Nomoto et al. | |
| 2013/0047423 A1 | 2/2013 | Miwa et al. | |
| 2013/0084384 A1 | 4/2013 | Yamakaji | |
| 2013/0134051 A1 * | 5/2013 | Takahashi | C25D 11/00 |
| | | | 205/615 |
| 2013/0156942 A1 | 6/2013 | Yamakaji et al. | |
| 2013/0266859 A1 | 10/2013 | Todoriki et al. | |
| 2013/0266869 A1 | 10/2013 | Todoriki et al. | |
| 2014/0113065 A1 * | 4/2014 | He | H01M 4/0404 |
| | | | 427/11 |

FOREIGN PATENT DOCUMENTS

| | | |
|---|---|---|
| JP | 2002-110162 A | 4/2002 |
| JP | 2003-238131 A | 8/2003 |
| JP | 2011-048992 A | 3/2011 |
| JP | 2011-105569 A | 6/2011 |
| WO | WO-2006/071076 | 7/2006 |
| WO | WO-2011/141486 | 11/2011 |

OTHER PUBLICATIONS

X. Zhou et al., "Graphene modified LiFePO4 cathode materials for high power lithium ion batteries", *J. Mater. Chem.*, 2011, vol. 21, pp. 3353-3358.

R. Sundaram et al., "Electrochemical Modification of Graphene", *Adv. Mater.*, 2008, vol. 20, Issue 16, pp. 3050-3053.

M. Zhou et al., "Controlled Synthesis of Large-Area and Patterned Electrochemically Reduced Graphene Oxide Films", *Chem. Eur. J.*, 2009, vol. 15, Issue 25, pp. 6116-6120.

J. Zhang et al., "Reduction of graphene oxide via L-ascorbic acid", *Chem. Commun.*, 2010, vol. 46, Issue 7, pp. 1112-1114.

S. Paek et al., "Enhanced Cyclic Performance and Lithium Storage Capacity of SnO2/Graphene Nanoporous Electrodes with Three-Dimensionally Delaminated Flexible Structure", *Nano Letters*, 2009, vol. 9, No. 1, pp. 72-75.

G. Wang et al., "Sn/graphene nanocomposite with 3D architecture for enhanced reversible lithium storage in lithium ion batteries", *J. Mater. Chem.*, 2009, vol. 19, No. 44, pp. 8378-8384.

D. Wang et al., "Self-Assembled TiO2-Graphene Hybrid Nanostructures for Enhanced Li-Ion Insertion", *ACS Nano*, 2009, vol. 3, No. 4, pp. 907-914.

Y. Shao et al., "Facile and controllable electrochemical reduction of graphene oxide and its applications", *J. Mater. Chem.*, 2010, vol. 20, Issue 1, pp. 743-748.

F. Su et al., "Flexible and planar graphene conductive additives for lithium-ion batteries", *J. Mater. Chem.*, 2010, vol. 20, Issue 43, pp. 9644-9650.

G. Yu et al., "Solution-Processed Graphene/MnO2 Nanostructured Textiles for High-Performance Electrochemical Capacitors", *Nano Letters*, 2011, vol. 11, No. 7, pp. 2905-2911.

Todoriki H. et al., "High performance lithium ion battery using Graphene Net electrode", 222nd ECS Meeting ABSTRACT, Oct. 7, 2012, p. 1014.

Z Wang et al., "Direct Electrochemical Reduction of Single-Layer Graphene Oxide and Subsequent Functionalization with Glucose Oxidase", *J. Phys. Chem. C*, 2009, vol. 113, No. 32, pp. 14071-14075.

S. Park et al., "Chemical structures of hydrazine-treated graphene oxide and generation of aromatic nitrogen doping", *Nat. Commun.*, 2012, vol. 3, Article No. 638.

C. Mattevi et al., "Evolution of electrical, chemical, and structural properties of transparent and conducting chemically derived graphene thin films", *Adv. Funct. Mater.*, 2009, vol. 19, Issue 16, pp. 2577-2583.

H. Zhang et al., "Vacuum-assisted synthesis of graphene from thermal exfoliation and reduction of graphite oxide", *J. Mater. Chem.*, 2011, vol. 21, Issue 14, pp. 5392-5397.

S. Park et al., "Hydrazine-reduction of graphite-and graphene oxide", *CARBON*, 2011, vol. 49, Issue 9, pp. 3019-3023.

D. Dreyer et al., "The chemistry of graphene oxide", *Chem. Soc. Rev.*, 2010, vol. 39, Issue 1, pp. 228-240.

Y. Shao et al., "Facile and controllable electrochemical reduction of graphene oxide and its applications", J. Mater. Chem., 2010, vol. 20, Issue 4, pp. 743-748.

\* cited by examiner

METHOD FOR MANUFACTURING ELECTRODE FOR STORAGE BATTERY

BACKGROUND OF THE INVENTION

1. Field of the Invention

The present invention relates to an electrode for a storage battery and a method for manufacturing the electrode for a storage battery.

2. Description of the Related Art

With the recent rapid spread of portable electronic devices such as mobile phones, smartphones, electronic books, and portable game machines, secondary batteries for drive power supply have been increasingly required to be smaller and to have higher capacity. Storage batteries typified by lithium-ion secondary batteries, which have advantages such as high energy density and high capacity, have been widely used as secondary batteries used for portable electronic devices.

A lithium-ion secondary battery, which is one of storage batteries and widely used due to its high energy density, includes a positive electrode including an active material such as lithium cobalt oxide ($LiCoO_2$) or lithium iron phosphate ($LiFePO_4$), a negative electrode formed of a carbon material such as graphite capable of reception and release of lithium ions, a nonaqueous electrolyte in which an electrolyte formed of a lithium salt such as $LiBF_4$ or $LiPF_6$ is dissolved in an organic solvent such as ethylene carbonate (EC) or diethyl carbonate (DEC), and the like. A lithium-ion secondary battery is charged and discharged in such a way that lithium ions in the secondary battery are transferred between the positive electrode and the negative electrode through the nonaqueous electrolyte and intercalated into or deintercalated from the active materials of the positive electrode and the negative electrode.

A binder is mixed into the positive electrode or the negative electrode in order that active materials can be bound or an active material and a current collector can be bound. Since the binder is generally an organic high molecular compound such as polyvinylidene fluoride (PVDF) which has an insulating property, the electric conductivity of the binder is extremely low. Therefore, as the ratio of the mixed binder to the active material is increased, the amount of the active material in the electrode is relatively decreased, resulting in the lower discharge capacity of the secondary battery.

Hence, by mixture of a conductive additive such as acetylene black (AB) or graphite particles, the electric conductivity between active materials or between an active material and a current collector can be improved. Thus, a positive electrode active material with high electric conductivity can be provided (see Patent Document 1).

REFERENCE

[Patent Document 1] Japanese Published Patent Application No. 2002-110162

SUMMARY OF THE INVENTION

However, because acetylene black used as a conductive additive is a high-volume particle with an average diameter of several tens of nanometers to several hundreds of nanometers, contact between acetylene black and an active material hardly becomes surface contact and tends to be point contact. Consequently, contact resistance between the active material and the conductive additive is high. Further, if the amount of the conductive additive is increased to increase contact points between the active material and the conductive additive, the percentage of the amount of the active material in the electrode decreases, resulting in the lower discharge capacity of the battery.

In the case where graphite particles are used as a conductive additive, natural graphite is generally used in consideration of cost. In this case, iron, lead, copper, or the like contained as an impurity in a graphite particle reacts with the active material or the current collector, which might reduce the potential or capacity of the battery.

Further, as particles of the active material become minuter, cohesion between the particles becomes stronger, which makes uniform dispersion in the binder or the conductive additive difficult. Consequently, a portion where active material particles are aggregated and densely present and a portion where active material particles are not aggregated and thinly present are locally generated. In the portion where active material particles are aggregated and to which the conductive additive is not mixed, the active material particles do not contribute to formation of the discharge capacity of the battery.

In view of the above problems, an object of one embodiment of the present invention is to provide an electrode for a storage battery including an active material layer with high density that contains a smaller percentage of conductive additive. Another object of one embodiment of the present invention is to provide a storage battery having a higher capacity per unit volume of an electrode with the use of the electrode for a storage battery.

In one embodiment of the present invention, graphene is used as a conductive additive included in an electrode. In particular, graphene oxide with high dispersibility is used as a raw material and is mixed with an active material and the like to form a mixture, the mixture is provided over a current collector, and then reduction treatment is performed, so that an electrode including graphene as a conductive additive is formed.

Graphene is a carbon material having a crystal structure in which hexagonal skeletons of carbon are spread in a planar form and is one atomic plane extracted from graphite crystals. Due to its electrical, mechanical, or chemical characteristics which are surprisingly excellent, the graphene has been expected to be used for a variety of fields of, for example, field-effect transistors with high mobility, highly sensitive sensors, highly-efficient solar cells, and next-generation transparent conductive films and has attracted a great deal of attention.

Note that graphene in this specification refers to single-layer graphene or multilayer graphene including two or more and hundred or less layers. Single-layer graphene refers to a one-atom-thick sheet of carbon molecules having π bonds. Graphene oxide refers to a compound formed by oxidation of such graphene. When graphene oxide is reduced to form graphene, oxygen contained in the graphene oxide is not entirely released and part of the oxygen remains in the graphene. The graphene may contain oxygen, which is measured by X-ray photoelectron spectroscopy (XPS), at 2 at. % or more and 20 at. % or less, preferably at 3 at. % or more and 15 at. % or less.

In the case where graphene is multilayer graphene including graphene obtained by reducing graphene oxide, the interlayer distance between graphene layers is greater than or equal to 0.34 nm and less than or equal to 0.5 nm, preferably greater than or equal to 0.38 nm and less than or equal to 0.42 nm, more preferably greater than or equal to 0.39 nm and less than or equal to 0.41 nm. In general graphite, the interlayer distance between single graphene layers is 0.34 nm. Since the interlayer distance between the graphene layers used for the power storage device of one embodiment of the present invention is longer than that in general graphite, carrier ions can easily transfer between the graphene layers in multilayer graphene.

In an electrode for a storage battery of one embodiment of the present invention, such graphene are used as a conductive additive of the electrode.

One embodiment of the present invention is a method for manufacturing an electrode for a storage battery. In the method, a slurry that contains an active material and graphene oxide is applied to a current collector and dried to form an active material layer over the current collector, the active material layer over the current collector is rolled up together with a film-like spacer, and a rolled electrode which includes the spacer are immersed in a reducing solution so that graphene oxide is reduced.

Another embodiment of the present invention is a method for manufacturing an electrode for a storage battery. In the method, an active material layer is formed over the current collector, the active material layer over the current collector is rolled up together with a film-like spacer, and the rolled active material layer which contains the spacer is immersed in a reducing solution.

Another embodiment of the present invention is a method for manufacturing an electrode for a storage battery. In the method, a slurry that contains an active material and graphene oxide is applied to a current collector and dried to form an active material layer over the current collector, the active material layer over the current collector is rolled up together with a film-like spacer, an electrode and the spacer, which are rolled up, are immersed in a reducing solution so that graphene oxide is reduced, the spacer is separated, and then the active material layer is dried in a reducing atmosphere.

Another embodiment of the present invention is a method for manufacturing an electrode for a storage battery. In the method, a slurry that contains an active material and graphene oxide is applied to a current collector and dried to form an active material layer over the current collector, the active material layer over the current collector is rolled up, an electrode, which is rolled up, is immersed in a reducing solution so that graphene oxide is reduced, and then the active material layer is dried in a reducing atmosphere.

In the above method for manufacturing a storage battery electrode, filter paper, unwoven fabric, or a porous support is used as the spacer.

In the above method for manufacturing an electrode for a storage battery, the reducing solution contains at least ascorbic acid as a reducing agent and water as a solvent. The pH of the reducing solution is higher than or equal to 4 and lower than or equal to 11.

According to one embodiment of the present invention, an electrode for a storage battery including an active material layer with high density that contains a smaller percentage of conductive additive can be provided. The use of the electrode for a storage battery enables fabrication of a storage battery having high capacity per unit volume of the electrode.

BRIEF DESCRIPTION OF THE DRAWINGS

In the accompanying drawings.

DETAILED DESCRIPTION OF THE INVENTION

Figure 1:
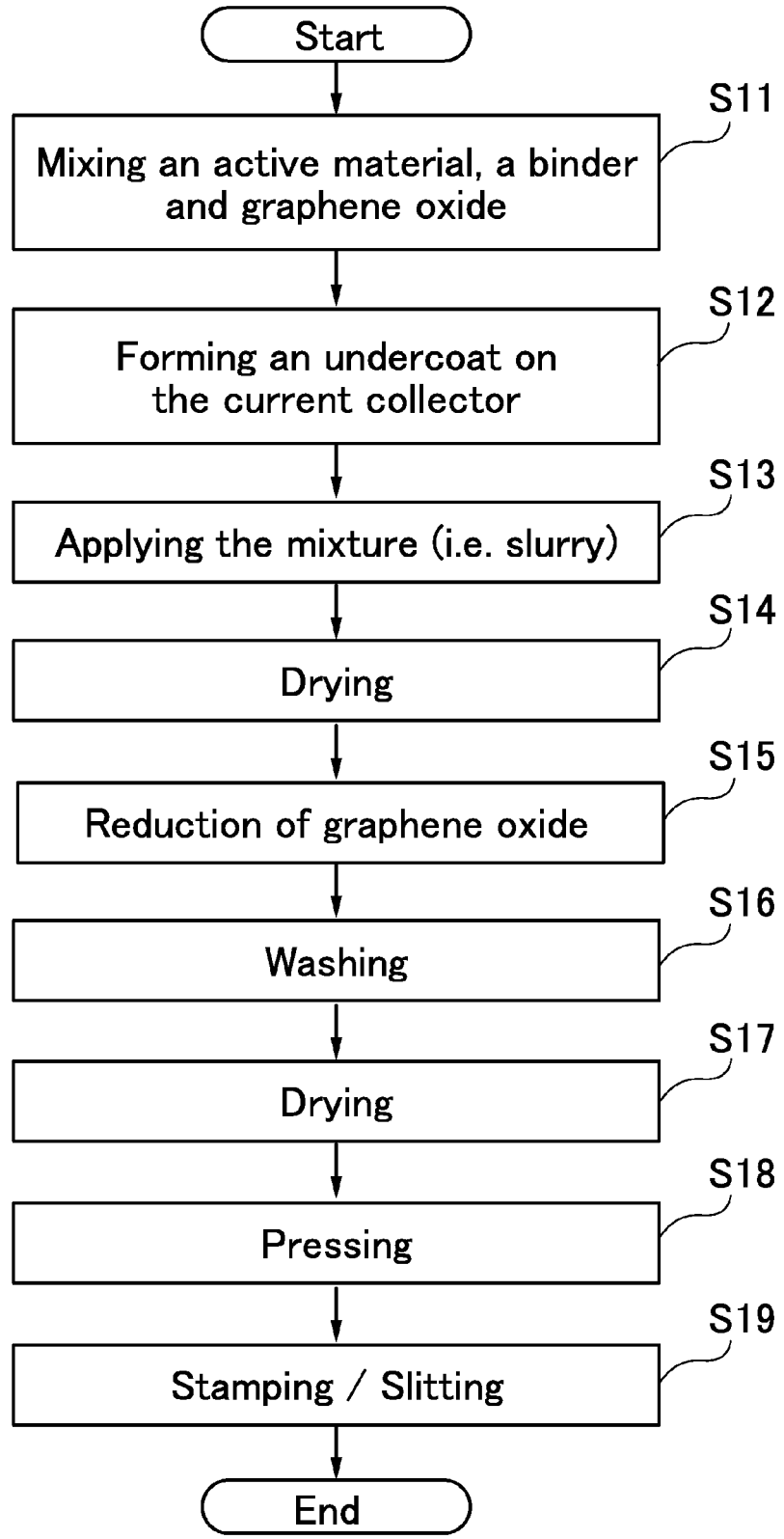
FIG. 1 is a flow chart showing a method for forming an electrode.

Hereinafter, embodiments and examples will be described with reference to drawings. Note that the embodiments and the examples can be implemented in many different modes, and it will be readily appreciated by those skilled in the art that modes and details thereof can be changed in various ways without departing from the spirit and scope of the present invention. Thus, the present invention should not be interpreted as being limited to the following descriptions of the embodiments and the examples.

Embodiment 1

In this embodiment, a method for forming an electrode for a storage battery of one embodiment of the present invention will be described with reference to FIG. 1.

First, a description will be given of the significance of forming graphene in an electrode for a storage battery by reducing graphene oxide. Then, a method for forming an electrode for a storage battery using graphene oxide will be described.

An electrode for a storage battery of one embodiment of the present invention includes graphene as a conductive additive. However, in the case where an electrode for a storage battery is formed in such a manner that graphene or graphene formed by reducing graphene oxide in advance (reduced graphene oxide; RGO) are mixed with an active material and a binder, graphene flakes or RGO flakes aggregate in the electrode because of its low dispersibility and thus it is difficult to achieve favorable battery characteristics.

On the other hand, in the case of using graphene oxide as a raw material of a conductive additive of an electrode, a mixture (also referred to as a slurry) formed by mixing graphene oxide, an active material, and a binder in a polar solvent (also referred to as a disperse medium) is applied to a current collector and then dried, and after that, the graphene oxide is reduced by reduction treatment, so that graphene can be formed. When an electrode is formed using this method, a graphene network as electric conduction is formed in an active material layer including an active material and a binder. Thus, an electrode for a storage battery including a highly conductive active material layer where active materials are electrically connected to each other by graphene can be formed.

This is because graphene oxide used as a raw material of graphene is a polar material having a functional group such as an epoxy group, a carbonyl group, a carboxyl group, or a hydroxyl group. Oxygen in the functional group in graphene oxide is negatively charged in a polar solvent; hence, graphene oxide flakes do not easily aggregate but strongly interact with the polar solvent such as 1-methyl-2-pyrrolidone (NMP). Thus, the functional group such as an epoxy group in the graphene oxide interacts with the polar solvent, which probably prevents aggregation among graphene oxide flakes, resulting in uniform dispersion of the graphene oxide flakes in the polar solvent.

When graphene oxide is used as a raw material of a conductive additive as described above, the graphene oxide has high dispersibility in the polar solvent but has low electric conductivity and thus does not function as a conductive additive without any change. For this reason, in forming an electrode for a storage battery, after at least an active material and graphene oxide flakes are mixed, the graphene oxide needs to be reduced to form graphene with high electric conductivity.

Examples of a method for reducing graphene oxide include reduction treatment with heating (hereinafter referred to as thermal reduction), electrochemical reduction treatment performed by application of a potential at which graphene oxide is reduced in an electrolytic solution (hereinafter referred to as electrochemical reduction), and reduction treatment using a chemical reaction caused with a reducing agent (hereinafter referred to as chemical reduction).

When graphene oxide is thermally reduced to increase its electric conductivity, it is preferable to perform heat treatment at higher than or equal to 1000° C. in an inert atmosphere such as an argon atmosphere. However, after graphene oxide is mixed with the active material and the binder such as PVDF, it is difficult to perform heat treatment at a temperature higher than to the upper temperature limit of the binder. For this reason, unless heat treatment is performed at a temperature lower than the upper temperature limit of the binder for several tens of hours, graphene oxide is hard to sufficiently reduce. Further, thermal reduction has a significant problem of requiring too much time, for battery fabrication.

When graphene oxide is reduced by long-time heat treatment, a functional group included in the graphene oxide might be released as $CO_2$, in which case defects are formed in graphene due to the released carbon. The formed defects decrease the electric conductivity of the electrode.

In the case of performing electrochemical reduction treatment, it is necessary to sufficiently apply voltage evenly to an electrode for a storage battery under the condition where an electrolytic solution does not dissolve materials of the electrode. In the case of performing electrochemical reduction treatment, it is necessary to apply voltage sufficiently evenly to an electrode for a storage battery under the condition where an electrolytic solution does not dissolve materials of the electrode. Further, in the case of the electrochemical reduction, it is required that a certain distance be maintained between a counter electrode and a current collector provided with an active material layer containing graphene oxide, and treatment be performed in an electrolytic solution. Variations in the distance between the counter electrode and the current collector cause unevenness in the degree of reduction of graphene oxide, leading to variations in the characteristics of the electrode.

Thus, in the method for forming the electrode for a storage battery of one embodiment of the present invention, chemical reduction is employed to reduce graphene oxide.

The method for forming the electrode for a storage battery by chemically reducing graphene oxide will be described below with reference to FIG. 1.

FIG. 1 is a flow chart showing the method for forming an electrode for a storage battery of one embodiment of the present invention. First, an active material, graphene oxide, and a binder are prepared. Note that the flow chart in FIG. 1 shows the case of using $LiFePO_4$ and PVDF as the active material and the binder, respectively.

The graphene oxide is a raw material of graphene that serves as a conductive additive later. Graphene oxide can be formed by various synthesis methods such as a Hummers method, a modified Hummers method, and oxidation of graphite. Note that the method for forming the electrode for a storage battery of one embodiment of the present invention is not limited by the degree of separation of graphene oxide flakes.

For example, in a Hummers method, graphite such as flake graphite is oxidized to give graphite oxide. Obtained graphite oxide is graphite which is oxidized in places and thus to which a functional group such as a carbonyl group, a carboxyl group, or a hydroxyl group is bonded. In the graphite oxide, the crystallinity of graphite is lost and the distance between layers is increased. Therefore, a graphene oxide flake can be easily obtained by separation of the layers from each other by ultrasonic treatment or the like.

The length of one side (also referred to as a flake size) of the graphene oxide flake is greater than or equal to 50 nm and less than or equal to 100 μm, preferably greater than or equal to 800 nm and less than or equal to 20 μm. Particularly in the case where the flake size is smaller than the average diameter of active material particles, surface contact with a plurality of the active material particles and connection between graphene flakes are difficult, resulting in difficulty in increasing the electric conductivity of the active material layer.

As shown in Step S11, the graphene oxide, the active material, and the binder are added to a polar solvent such as 1-methyl-2-pyrrolidone (NMP) or dimethylformamide, and they are mixed to prepare a paste mixture (also referred to as a slurry). When a material which significantly interacts with graphene oxide is used for the active material, graphene oxide flakes can be more uniformly dispersed in the active material layer.

Here, preparation of a slurry will be described in detail. First, the graphene oxide flakes are preferably dispersed in the polar solvent such as NMP.

When the graphene oxide account for less than or equal to 0.1 wt % of the total weight of the active material, the graphene oxide, and the binder, the electric conductivity of the electrode including the active material layer is low. When the graphene oxide account for more than 10 wt % of the total weight, the electric conductivity of the electrode high while the viscosity of the slurry is high depending on the particle diameter of the active material. Further, in a drying step after application of the slurry to the current collector, convection is generated in a positive electrode paste due to heating. Graphene oxide flakes that are light and thin move and aggregate together owing to the convection; consequently, drying the active material layer might generate cracks in the active material layer or might cause the active material layer to be separated from the current collector. In other words, the strength of the electrode tends to decline. Therefore, the graphene oxide preferably account for more than or equal to 0.2 wt % and less than or equal to 10 wt %, more preferably more than or equal to 0.3 wt % and less than or equal to 0.8 wt % of the total weight of the active material, the graphene oxide, and the binder.

Next, the active material is added to the graphene oxide flakes dispersed in the polar solvent, and the active material, the graphene oxide flakes, and the polar solvent are mixed, whereby the graphene oxide flakes and the active material that have aggregated can be separated. Since graphene oxide has a functional group, oxygen in the functional group is negatively charged in a polar solvent; thus, graphene oxide flakes do not easily aggregate. Owing to interaction with the active material, the graphene oxide flakes can be dispersed more uniformly.

Next, the binder is added to the mixture. By adding the binder while the graphene oxide flakes are uniformly dispersed to be in contact with a plurality of active material particles, the active material and the graphene oxide flakes can be bound to each other while maintaining the dispersed state. Depending on the compounding ratio between the active material and the graphene oxide, the binder does not need to be added; however, adding the binder increases the strength of the electrode.

Then, the polar solvent is added to the mixture until the mixture has predetermined viscosity and the polar solvent and the mixture are mixed; thus, the slurry can be prepared. In this step, the mixing and the addition of the polar solvent may be repeated more than once.

Through the above steps, the slurry is formed so that the active material, the graphene oxide flakes, and the binder are uniformly dispersed in the slurry.

In the case of forming a positive electrode as the electrode for the storage battery, the compounding ratio of the active material to the graphene oxide and the binder at the time of preparing the slurry is preferably 91:4:5 to 94.8:0.2:5, for example. In this embodiment, the compounding ratio of the active material to the graphene oxide and the binder is 94.4:0.6:5.

Next, an undercoat is formed over the current collector (Step S12). Note that the undercoat refers to a coating layer that reduces contact resistance and increases interface adhesion. Examples of the undercoat include a carbon layer, a metal layer, a layer containing carbon and high molecules, and a layer containing metal and high molecules. Forming the undercoat over the current collector can reduce the resistance at the interface between the current collector and the active material layer formed later, and/or can increase adhesion between the active material layer and the current collector. The undercoat is preferably not dissolved by a reducing solution in the process of reducing graphene oxide. As the undercoat, for example, an aqueous solution in which graphite, acetylene black, and the like are dispersed or the aqueous solution into which high molecules are mixed can be used. Examples of the undercoat include a mixture of graphite and sodium polyacrylate (PAA) and a mixture of AB and PVDF. The compounding ratio of graphite to PAA is preferably 95:5 to 50:50, and the compounding ratio of AB to PVDF is preferably 70:30 to 50:50.

Note that if there is no problem with the adhesion between the current collector and the active material layer, the electrode strength, and the contact resistance, it is not necessary to apply the undercoat to the current collector.

Next, the slurry is formed over one surface of the current collector or formed so that the current collector is sandwiched therebetween by a coating method such as a doctor blade method (Step S13).

The slurry formed over the current collector is dried by a method such as ventilation drying or reduced pressure (vacuum) drying to form the active material layer (Step S14). The drying is preferably performed using a hot wind with a temperature of 50° C. to 180° C. inclusive. Through this step, the polarity solvent contained in the active material layer is evaporated. Note that there is no particular limitation on the atmosphere.

The active material layer may be pressed by a compression method such as a roll press method or a flat plate press method so as to be consolidated. Further, by applying heat at higher than or equal to 90° C. and lower than or equal to 180° C., preferably lower than or equal to 120° C. when the pressing is performed, the binder (e.g., PVDF) contained in the undercoat or the active material layer is softened to the extent such that the characteristics of the electrode is not changed; thus, the adhesion between the current collector and the active material layer can be further increased.

Next, reduction treatment of the graphene oxide is performed (Step S15). In one embodiment of the present invention, chemical reduction is employed to reduce graphene oxide. The chemical reduction is performed using a reducing solution.

Next, reaction is caused in a reducing agent (Step S15), whereby the graphene oxide included in the active material layer is reduced to form graphene. Note that it is possible that oxygen in the graphene oxide is not necessarily entirely released and partly remains in the graphene. The graphene may contain oxygen, which is measured by XPS, at 2 at % or more and 20 at % or less, preferably at 3 at % or more and 15 at % or less. This reduction treatment is preferably performed at higher than or equal to room temperature and lower than or equal to 150° C., more preferably at higher than or equal to room temperature and lower than or equal to 80° C. In addition, the reduction time of the graphene oxide can be 3 minutes to 10 hours inclusive.

Examples of a reducing agent in the reducing solution are ascorbic acid, hydrazine, dimethyl hydrazine, hydroquinone, sodium boron hydride ($NaBH_4$), tetra butyl ammonium bromide (TBAB), lithium aluminium hydride ($LiAlH_4$), N,N-diethylhydroxylamine, and a derivative thereof. For example, ascorbic acid and hydroquinone are preferable to hydrazine and sodium boron hydride in that they are safe owing to low reducing ability and utilized industrially with ease.

A polar solvent can be used as the solvent in the reducing solution. Any material can be used for the polar solvent as long as it can dissolve the reducing agent. For example, any one of water, methanol, ethanol, acetone, tetrahydrofuran (THF), dimethylformamide (DMF), 1-methyl-2-pyrrolidone (NMP), dimethyl sulfoxide (DMSO), ethylene glycol, diethylene glycol, and glycerin, or a mixed solution of any two or more of the above can be used.

Further, a reducing solution with a pH less than 4 might cause dissolution of an active material. A reducing solution with a pH greater than or equal to 11 might cause gelation of PVDF used as a binder. For these reasons, the pH of the reducing solution is greater than or equal to 4 and less than 11, preferably greater than or equal to 5 and less than or equal to 7. Any kind of alkaline solution or alkaline salt can be used as a pH adjuster; for example, sodium hydroxide, potassium hydroxide, calcium hydroxide, lithium hydroxide, ammonium hydroxide, sodium carbonate, potassium carbonate, calcium carbonate, or lithium carbonate can be used.

As the reducing solution, a mixed solution of ethanol and ascorbic acid or a mixed solution of water, ascorbic acid, and lithium hydroxide can be used. In this embodiment, a reducing solution containing ascorbic acid, water, and lithium hydroxide is used.

Graphene is probably formed in such a manner that protons are added tographene oxide by ascorbic acid when an active material layer formed over a current collector is soaked in a reducing solution, and then, the graphene oxide is reduced by the release of $H_2O$. Reducing graphene oxide by using a reducing solution can inhibit release of carbon from graphene as compared with the case of thermal reduction.

Subsequently, the current collector over which the active material layer is formed is washed (Step S16), and is dried (Step S17). The washing of the current collector over which the active material layer is formed is preferably performed using a solution given as the solvent contained in the reducing solution. The solution may be either the same as or different from the solvent contained in the reducing solution. The drying is preferably performed in a reduced pressure (vacuum) atmosphere or a reduction atmosphere. This drying step is performed at, for example, 50° C. to 200° C. inclusive for 1 hour to 48 hours inclusive. The drying allows sufficient evaporation or removal of the polar solvent and moisture in the active material layer. The drying step can also facilitate the reduction of the graphene oxide.

Next, the current collector over which the active material layer is formed is pressed (Step S18). Thus, the adhesion between the current collector and the active material layer can be increased. In addition, the active material layer can be consolidated. Further, by applying heat at higher than or equal to 90° C. and lower than or equal to 180° C., preferably lower than or equal to 120° C. when the pressing is performed, the binder (e.g., PVDF) contained in the undercoat or the active material layer is softened to the extent such that the characteristics of the electrode is not changed; thus, the adhesion between the current collector and the active material layer can be further increased.

Finally, the current collector and the active material layer are stamped to have a predetermined size (Step S19), whereby the storage battery electrode is formed.

In the above-described formation process of the storage battery electrode, the active material layer is pressed in Step S18; however, the active material layer may be pressed after the washing step of Step S16 or the drying step of Step S14. That is, the step of pressing the active material layer can be performed after any of the drying step of Step S14, the washing step of Step S16, and the drying step of Step S17, or may be skipped as appropriate. Note that the active material layer is preferably immersed in the reducing solution uniformly to promote the reduction of the graphene oxide contained in the active material layer. For this reason, the active material layer preferably has low density at the time of the reduction step, and the step of pressing the active material layer is preferably performed after the reduction step.

Through the above steps, the storage battery electrode including the active material layer in which the graphene flakes are uniformly dispersed to the active material can be formed.

Further, adding and mixing the active material into the graphene oxide flakes dispersed in the polar solvent allow the graphene oxide flakes to be dispersed more uniformly. Furthermore, the active material layer in which graphene flakes are uniformly dispersed can be formed in such a manner that the binder is added, the slurry in which graphene oxide flakes are uniformly dispersed is applied to the current collector, and then the graphene oxide is reduced.

When graphene oxide is reduced by heat treatment, a functional group included in the graphene oxide might be released as $CO_2$, in which case a defect is formed in the graphene due to the released C. The defect formed in the graphene decreases the electric conductivity of the electrode.

In contrast, when graphene oxide is reduced by chemical reduction, only a functional group included in the graphene oxide can be released as described in this embodiment, which makes it possible to prevent formation of a defect in graphene.

When graphene oxide is reduced by chemical reduction, the temperature of the reduction of the graphene oxide can be higher than or equal to room temperature and lower than or equal to 150° C., preferably higher than or equal to room temperature and lower than or equal to 80° C. Further, the reduction time of the graphene oxide can be longer than or equal to 3 minutes and shorter than or equal to 10 hours. Thus, the graphene oxide can be reduced at lower temperature in shorter time.

In chemical reduction, the active material layer is uniformly immersed in the reducing solution; therefore, the graphene oxide can be sufficiently reduced at lower temperature in shorter time than in thermal reduction. Accordingly, the graphene oxide can account for greater than or equal to 0.2 wt % and less than or equal to 10 wt %, preferably greater than or equal to 0.3 wt % and less than or equal to 0.8 wt % of the total weight of the solid content in the slurry. Thus, the amount of the conductive additive in the active material layer can be less than 1 wt %, increasing the active material content.

The graphene formed in the above manner is in contact with part of a surface of the active material. The plurality of graphene flakes are formed in such a way as to wrap or coat a plurality of the active material particles, or be adhered to surfaces of a plurality of the active material particles, so that the graphene flakes make surface contact with the active material particles. Further, the graphene flakes are also in surface contact with each other; consequently, the plurality of graphene flakes form a three-dimensional network for electronic conduction. This makes it possible to increase the electric conductivity between the active material particles or between the active material and the current collector. The use of such an electrode can improve the cycle performance and the discharging rate of the storage battery.

The use of graphene as a conductive additive enables formation of a storage battery electrode including an active material layer with high density that contains a smaller percentage of conductive additive. The use of the storage battery electrode allows fabrication of a storage battery having high capacity per unit volume of the electrode.

This embodiment can be implemented in combination with any of the other embodiments as appropriate.

Embodiment 2

In this embodiment, the case of employing the method for forming an electrode for a storage battery that is described in Embodiment 1 for mass production will be described with reference to FIG. 2 and FIGS. 3A to 3C.

It is preferable to successively perform steps to complete a storage battery electrode from a step of applying a slurry to a substrate, with the use of a fabricating apparatus such as a roll-to-roll apparatus, in the method for forming a storage battery electrode in Embodiment 1. In the case of successively perform the steps with the use of a fabricating apparatus such as a roll-to-roll apparatus, however, a change in the concentration of a reducing solution with time in a reduction step of graphene oxide causes variation in the reduction amount of graphene oxide in storage battery electrodes, resulting in uneven characteristics of the storage battery electrodes.

Preventing a change in the concentration of a reducing solution requires a control mechanism that maintains the constant concentration of the reducing solution in a fabricating apparatus of a storage battery electrode. In the case where reduction time is adjusted in accordance with the concentration of a reducing solution, a fabricating apparatus of a storage battery electrode needs such a control mechanism. Further, adjusting reduction time is accompanied by the necessity of adjusting time for a washing step and a drying step after the reduction step; thus, more control mechanisms are required, increasing the fabrication cost.

In the case of performing a reduction step of graphene oxide by batch treatment, an electrode under the treatment has a rolled shape. Depending on a reducing solution, it is difficult for the reducing solution to permeate the inside of the roll or a center portion distant from an end portion of the electrode.

The quality of a storage battery electrode depends on the reduction step of graphene oxide. Accordingly, it is difficult to achieve uniform quality when conditions for reduction treatment vary in the reduction step of graphene oxide. Thus, mass-producing storage battery electrodes that include graphene oxide and have uniform quality has a problem of increasing the manufacturing cost.

A method for fabricating a power storage device of one embodiment of the present invention will be described below with reference to FIG. 2 and FIGS. 3A to 3C.

Figure 2:
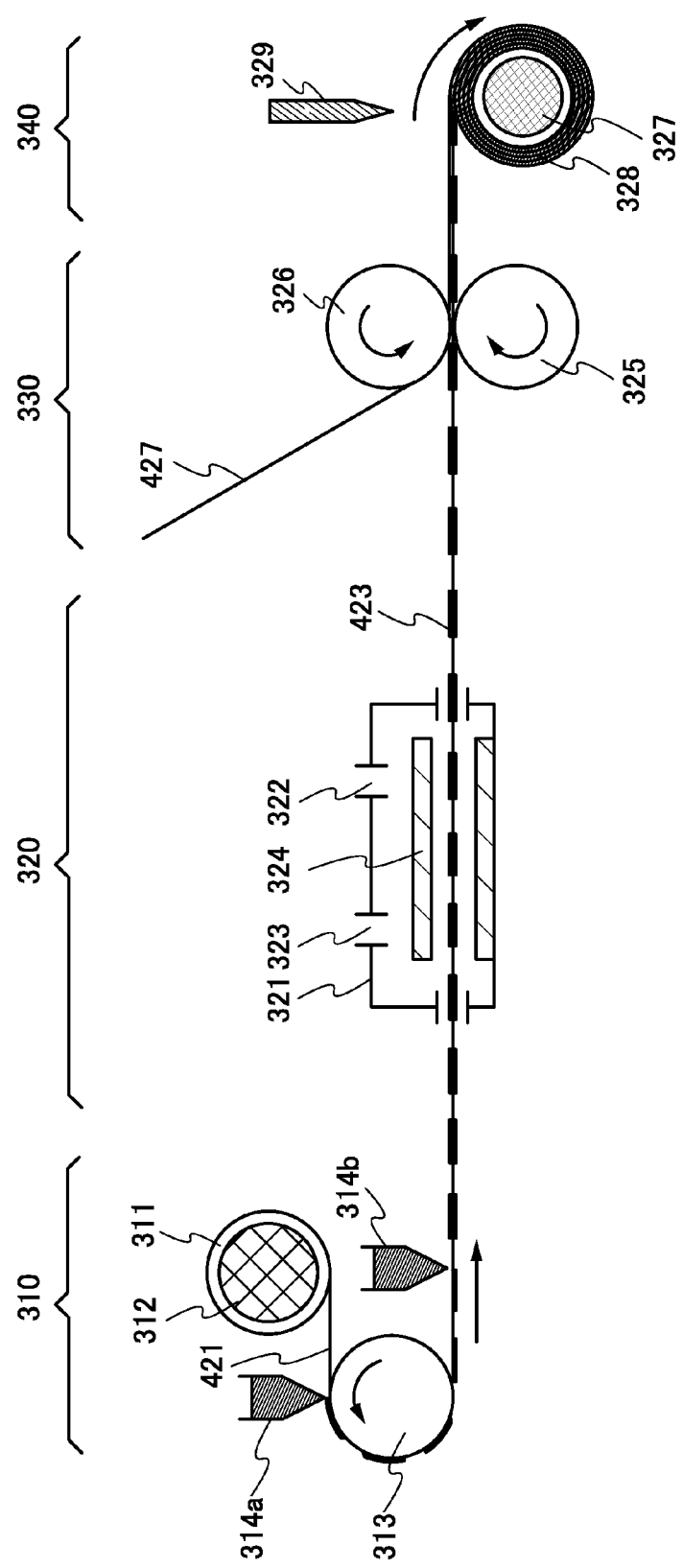
FIG. 2 illustrates a forming process of an electrode for a storage battery.

The fabricating process of a storage battery electrode that is illustrated in FIG. 2 and FIGS. 3A to 3C includes a step 310 of applying a slurry to a current collector 421; a step 320 of drying the slurry to form an active material layer 423; a step 330 of stacking a spacer 427 over the active material layer 423; a step 340 of rolling up the spacer 427 and the current collector 421 over which the active material layer 423 is formed; a reduction step 350 of reducing graphene oxide; a washing step 360 of washing the rolled current collector 421; a step 370 of separating the spacer 427 from the current collector 421; a step 380 of drying the current collector 421; and a step 390 of rolling up a completed storage battery electrode. As illustrated in FIG. 2, the steps from the step 310 of applying a slurry to the current collector 421 a step 340 of rolling up the spacer 427 and the current collector 421 over which the active material layer 423 is formed can be successively performed. Further, the steps from the step 370 of separating the spacer 427 from the current collector 421 to the step 390 of rolling up a completed storage battery electrode can be successively performed. In FIG. 2 and FIGS. 3A to 3C, the step of forming an undercoat over the current collector 421 and the step of performing pressing that are described in Embodiment 1 are omitted. Alternatively, the current collector 421 provided with an undercoat in advance may be used.

FIG. 2 illustrates the steps from the step 310 of applying a slurry to the current collector 421 to the step 340 of rolling up the spacer 427 and the current collector 421 over which the active material layer 423 is formed.

In the step 310 in FIG. 2, a roll-out mechanism 312 (also referred to as an unwinder) is provided with a first bobbin 311 around which the current collector 421 is wound and a slurry is applied to one surface of the current collector 421 by a first slurry attaching means 314a by utilization of rotation of a roller 313. Further, the slurry is applied to the other surface of the current collector 421 by a second slurry attaching means 314b. Note that the slurry may be applied to only one surface of the current collector 421. Examples of such a slurry attaching means include a slot die coater, a lip coater, a blade coater, a reverse coater, and a gravure coater. The number of rollers used to reverse the current collector 421 may be increased depending on the kind of the coater used. Alternatively, a dip method, a spray method, or the like can be employed.

In the step 320, the slurry applied to the current collector 421 is dried in a first chamber 321 having an inlet 322, an outlet 323, and a drying means 324. By drying the slurry, the active material layer 423 can be formed over the current collector 421. For the slurry drying means 324, one of hot-air heating, lamp heating, induction heating, air blowing, and the like or a combination of two or more of the above can be employed.

In the step 330, the spacer 427 can be stacked over the active material layer 423 and the active material layer 423 and the spacer 427 can be attached to each other by rollers 325 and 326. The spacer 427 is provided in order to prevent the active material layer 423 from being attached to the active material layer 423 in another layer and preclude damage to the active material layer 423 in the later step of rolling up the current collector 421 over which the active material layer 423 is formed. Thus, the spacer 427 should have at least a function of maintaining a constant distance between the active material layer 423 and the active material layer 423.

Examples of the spacer 427 include filter paper and nonwoven fabric. The use of filter paper or nonwoven fabric as the spacer 427 enables reducing solution permeation through the spacer 427. Alternatively, a porous support such as a plastic net of polypropylene, polyethylene, nylon, or the like can be used as the spacer 427. Thus, when the spacer 427 is used, a reducing solution can permeate the active material layer 423 in the reduction step 350 performed later, and the reducing solution and a washing solution are unlikely to be left on the spacer 427 after the reduction step 350 and the washing step 360.

In the step 340, the spacer 427 and the current collector 421 over which the active material layer 423 is formed are rolled up around a second bobbin 328 provided for a roll-up mechanism 327 (also referred to as a winder). After being rolled up around the second bobbin 328 a predetermined number of times, the spacer 427 and the current collector 421 are cut by a cutting means 329 such as a cutter.

Figure 3A:
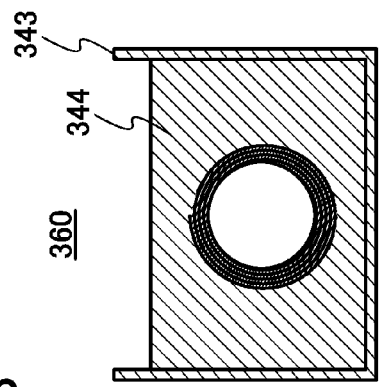
FIGS. 3A to 3C illustrate a forming process of an electrode for a storage battery.

Next, in the reduction step 350, graphene oxide contained in the active material layer 423 is reduced as illustrated in FIG. 3A. The current collector 421 rolled up around the second bobbin 328 is immersed in a reducing solution 342 in a first bath 341. The pH of the reducing solution 342 is greater than or equal to 4 and less than 11, preferably greater than or equal to 5 and less than or equal to 7. A temperature for this reduction treatment depends on the boiling point of a solvent in the reducing solution and is preferably higher than or equal to room temperature and lower than or equal to 150° C., more preferably higher than or equal to room temperature and lower than or equal to 90° C. Further, the reduction time of the graphene oxide can be longer than or equal to 3 minutes and shorter than or equal to 10 hours. A higher temperature of the reducing solution can facilitate reduction of the graphene oxide. Further, stirring the reducing solution in the reduction step 350 can promote reduction of the graphene oxide.

Raising the temperature of the reducing solution may cause evaporation of the solvent contained in the reducing solution, resulting in generation of air bubbles, depending on the boiling point of the solvent. The generated air bubbles left in the active material layer hinder reduction of graphene oxide, which might cause unevenness in the degree of reduction of graphene oxide.

As shown in FIG. 2 and FIGS. 3A to 3C, however, winding the spacer and the current collector over which the active material layer is formed enables such air bubbles to be released to the outside of the active material layer through the spacer; thus, the air bubbles left in the active material layer can be reduced. This prevents unevenness in the degree of reduction of graphene oxide in the active material layer.

Because the current collector 421 over which the active material layer 423 is formed is rolled up together with the spacer 427, the reducing solution permeates the inside of the roll and a center portion distant from an end portion of an electrode, allowing graphene oxide in the active material layer 423 to be reduced. Further, in washing the current collector 421 over which the active material layer 423 is formed, a washing solution permeates the inside of the roll and a center portion distant from the end portion of the electrode, which can prevent the reducing solution from being left in the active material layer 423

Figure 3B:
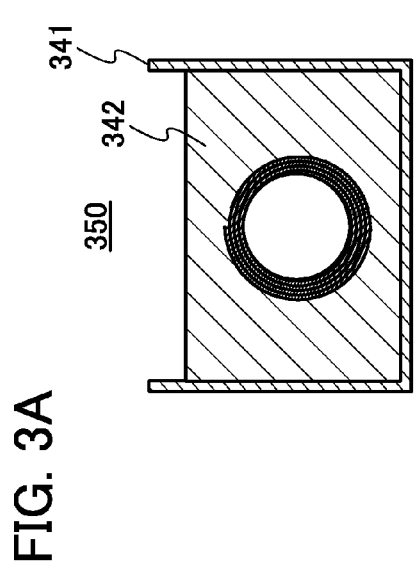

Next, in the washing step 360, the current collector 421 over which the active material layer 423 is formed is washed as illustrated in FIG. 3B. The current collector 421 that has been subjected to the reduction step is immersed in a washing solution 344 in a second bath 343. The current collector 421 over which the active material layer 423 is formed is preferably washed using, for example, the solution given as an example of the solvent in the reducing solution. The solution may be either the same as or different from the solvent contained in the reducing solution. Also in the washing step 360, stirring the washing solution facilitates washing of the active material layer.

Figure 3C:
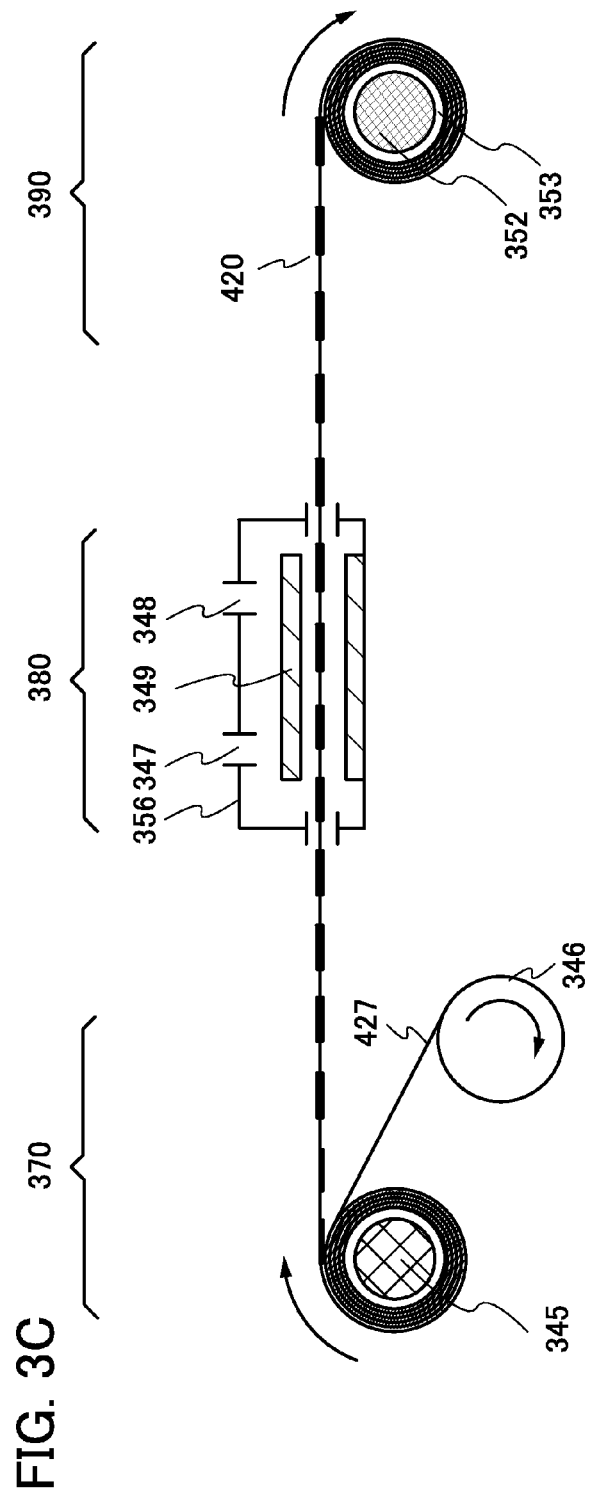

Next, in the step 370, a roll-out mechanism 345 is provided with the second bobbin 328, and the spacer 427 is separated from the current collector 421 by utilization of rotation of a roller 346 as illustrated in FIG. 3C. The use of filter paper, unwoven fabric, or a plastic net as the spacer 427 prevents the washing solution from being left.

In the step 380, the active material layer 423 formed over the current collector 421 is dried in a second chamber 356 having an inlet 347, an outlet 348, and a drying means 349. For the drying means 349, one of hot-air heating, lamp heating, induction heating, air blowing, and the like or a combination of two or more of the above can be employed. The drying in the step 380 is preferably performed in a reduced pressure (vacuum) atmosphere or a reduction atmosphere. Further, this drying step is preferably performed at, for example, 50° C. to 200° C. inclusive for 1 hour to 48 hours inclusive. The drying allows evaporation or removal of the polar solvent and moisture in the active material layer 423. The drying step can also facilitate the reduction of the graphene oxide.

Through the above steps, an electrode 420 can be fabricated.

Finally, in the step 390, the electrode 420 is rolled up around a third bobbin 353 provided for a roll-up mechanism 352.

In one embodiment of the present invention, after the spacer 427 is attached to the active material layer 423, the current collector 421 is rolled up. This allows the reducing solution to permeate the entire roll; therefore, graphene oxide can be reduced even in a center portion of the roll in the reduction step 350. Further, in the washing step 360 after the reduction step 350, washing can be performed without leaving the reducing solution even in the center portion of the roll.

The method for forming an electrode for a storage battery of one embodiment of the present invention can be performed in various modes.

Figure 4:
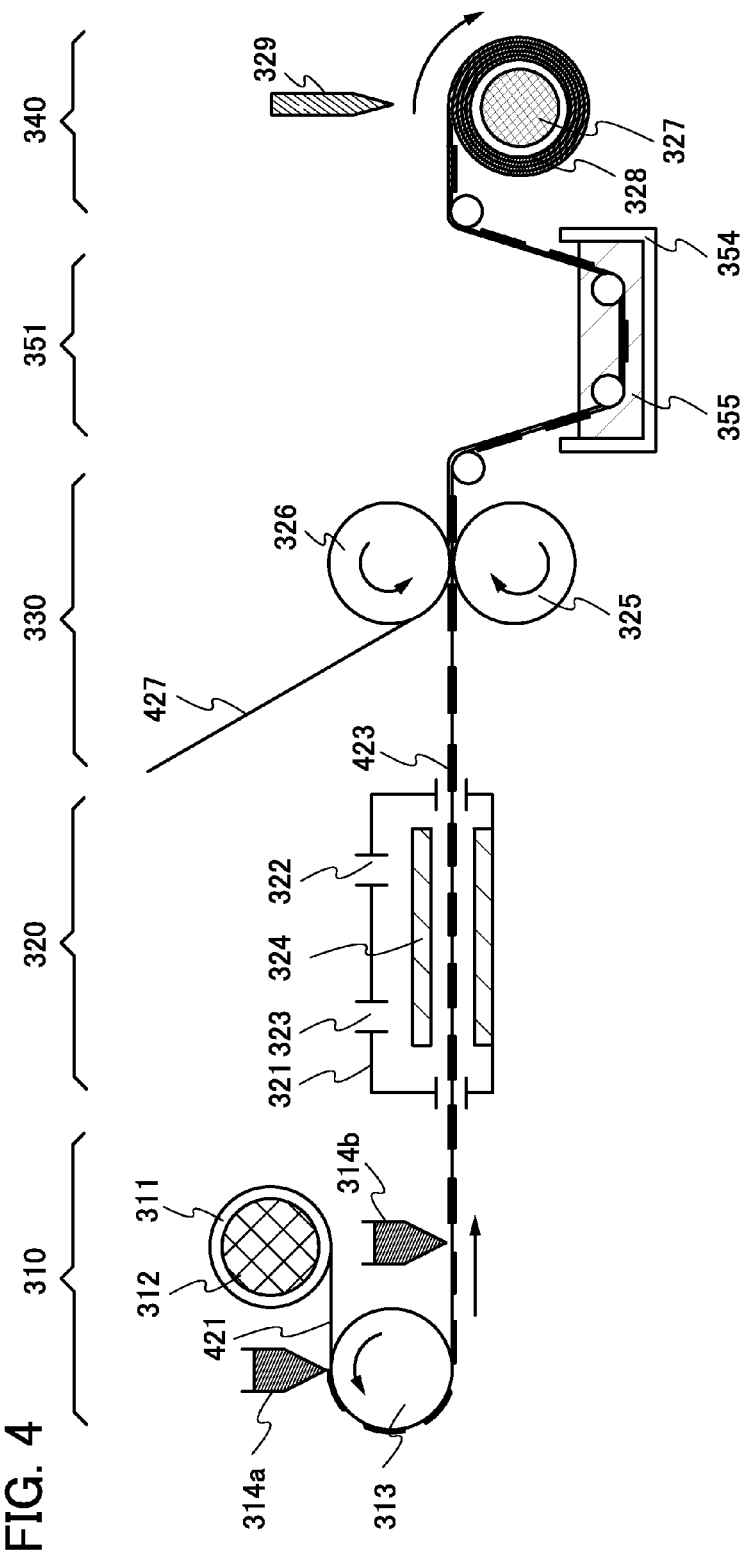
FIG. 4 illustrates a forming process of an electrode for a storage battery.

FIG. 4 illustrates a fabricating process partly different from that in FIG. 2.

As illustrated in FIG. 4, after the step 330 of stacking the spacer 427 over the active material layer 423, a reduction step 351 of immersing the spacer 427 and the active material layer 423 formed over the current collector 421 in the reducing solution may be added.

As illustrated in FIG. 4, in the reduction step 351, the spacer 427 and the active material layer 423 formed over the current collector 421 are immersed in a reducing solution 355 in a third bath 354. After that, in the step 340, the spacer 427 and the current collector 421 over which the active material layer 423 is formed are rolled up around the second bobbin 328 provided for the roll-up mechanism 327.

In the reduction step 351, spraying the reducing solution may be performed by a line shower (an apparatus provided with a plurality of reducing solution jets in the direction substantially perpendicular to the direction in which a current collector is carried), as well as immersing the active material layer in the reducing solution.

The active material layer 423 and the spacer 427 are immersed in the reducing solution in advance and then the current collector 421 and the spacer 427 are rolled up around the second bobbin 328, whereby the reducing solution can more easily permeate the active material layer. After the current collector 421 and the spacer 427 are rolled up around the second bobbin 328 a predetermined times, the current collector 421 and the spacer 427 are cut by the cutting means 329. Then, in the reduction step 350 in FIG. 3A, the current collector 421 rolled up around the second bobbin is immersed in the reducing solution 342 in the first bath 341, whereby graphene oxide is reduced.

The spacer 427 and the active material layer 423 are immersed in the reducing solution in the reduction step 351 and then the reduction step 350 is performed, whereby the reducing solution can permeate the active material layer 423 and the spacer 427 inside the roll, leading to uniform reduction of graphene oxide.

Figure 5A:
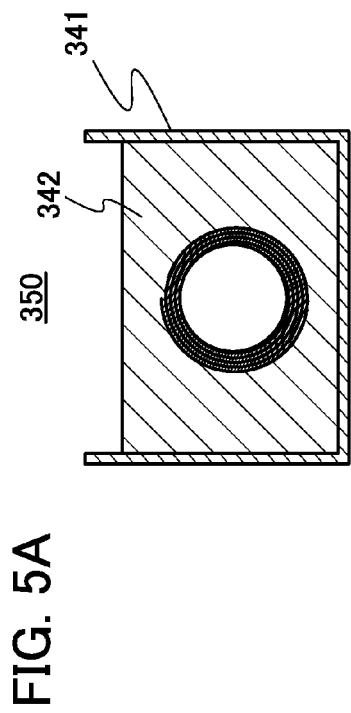
FIGS. 5A and 5B illustrate a forming process of an electrode for a storage battery.
Figure 5B:
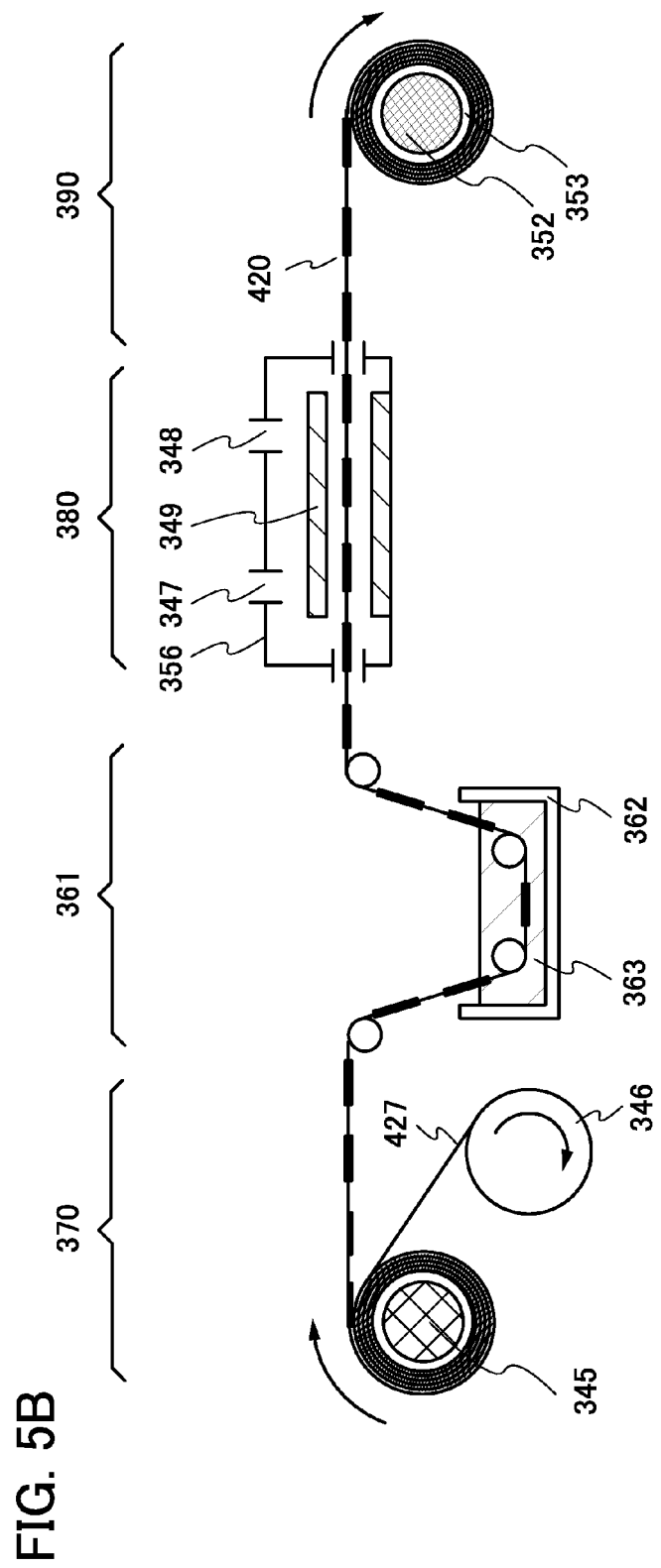

FIGS. 5A and 5B illustrate a fabricating process partly different from that in FIGS. 3A to 3C.

First, the reduction step 350 of graphene oxide is performed as illustrated in FIG. 5A. Then, in the step 370 in FIG. 5B, the second bobbin 328 is provided for the roll-out mechanism 345, and the spacer 427 is separated from the current collector 421 by utilization of rotation of the roller 346, and after that, the active material layer may be washed in a washing step 361. At that time, the active material layer may be washed by spraying the washing solution by a line shower as well as by immersing the whole current collector in the washing solution.

In the washing step 361, the active material layer formed over the current collector 421 is immersed in a washing solution 363 in a fourth bath 362 as illustrated in FIG. 5B. After that, drying may be performed in the step 380. Through the above steps, the electrode is fabricated.

As described in this embodiment, the method for forming a storage battery electrode can be performed in various modes. The steps from the reduction step 350 to the step 390 in FIGS. 3A to 3C or the steps from the reduction step 350 to the step 390 in FIGS. 5A and 5B may be performed either after the steps 310 to 340 illustrated in FIG. 2 are performed or after the steps 310 to 340 illustrated in FIG. 4 are performed. Thus, one embodiment of the present invention can be implemented by combining the steps illustrated in FIG. 2, FIG. 3A to 3C, FIG. 4, and FIGS. 5A and 5B as appropriate.

Although not described in this embodiment, a step of pressing the active material layer may be performed at least once in the steps illustrated in FIG. 2, FIG. 3A to 3C, FIG. 4, and FIGS. 5A and 5B. Note that the step is preferably performed after the reduction step in order that the reducing solution permeate the active material layer more easily.

Although the case is described in this embodiment in which the reducing solution also permeate the spacer when the reduction step is performed, one embodiment of the present invention is not limited to this. The use of a solvent having a high boiling point in a reducing solution can inhibit air bubbles from being left in an active material layer, depending on the temperature of the reducing solution in the reduction step. Thus, air bubbles can be inhibited from being left in the active material layer even without a spacer, and the reducing solution can permeate the inside of the roll.

According to one embodiment of the present invention, the use of graphene as a conductive additive enables formation of a storage battery electrode including an active material layer with high density that contains a smaller percentage of conductive additive. The use of the storage battery electrode allows fabrication of a storage battery having high capacity per unit volume of the electrode.

The method for forming an electrode for a storage battery that is described in this embodiment is excellent for mass production of storage battery electrodes.

This embodiment can be implemented in combination with any of the other embodiments as appropriate.

Embodiment 3

In this embodiment, a battery cell and a fabricating method thereof will be described with reference to FIGS. 6A to 6C, FIGS. 7A to 7C, and FIGS. 8A to 8C.

First, the structure of a battery cell will be described. The storage battery electrode of one embodiment of the present invention can be used as either or both of a positive electrode and a negative electrode.

First, a positive electrode that can be used for a battery cell will be described with reference to FIGS. 6A to 6C.

Figure 6A:
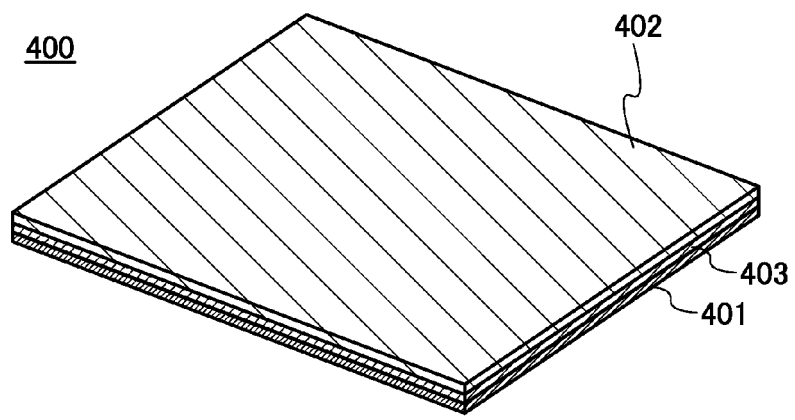
FIGS. 6A to 6C illustrate a positive electrode.
Figure 6B:
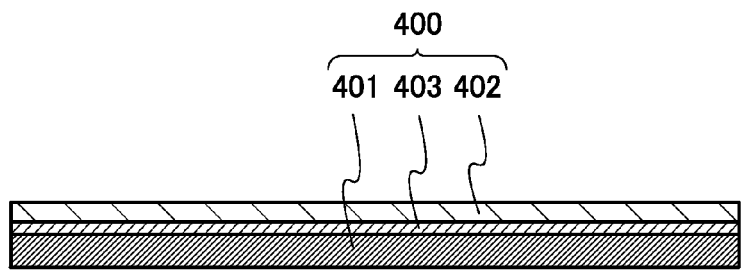

FIG. 6A is a perspective view of a positive electrode 400, and FIG. 6B is a cross-sectional view of the positive electrode 400. The positive electrode 400 includes a positive electrode current collector 401 and a positive electrode active material layer 402 formed over the positive electrode current collector 401 by a coating method, a CVD method, a sputtering method, or the like, for example. Further, an undercoat 403 is provided between the positive electrode current collector 401 and the positive electrode active material layer 402. Although FIG. 6A illustrates an example of providing the positive electrode active material layer 402 over one of surfaces of the positive electrode current collector 401 with a sheet shape (or a strip-like shape), one embodiment of the present invention is not limited to this example. The positive electrode active material layers 402 may be provided so that the positive electrode current collector 401 is sandwiched therebetween. Further, although the positive electrode active material layer 402 is provided over the whole positive electrode current collector 401 in FIG. 6A, the positive electrode active material layer 402 may be provided over part of the positive electrode current collector 401. For example, a structure may be employed in which the positive electrode active material layer 402 is not provided in a portion where the positive electrode current collector 401 is connected to a positive electrode tab.

The positive electrode current collector 401 can be formed using a material that has high electric conductivity and is not alloyed with a carrier ion of lithium or the like, such as a metal typified by stainless steel, gold, platinum, zinc, iron, copper, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 401 can have a foil-like shape, a plate-like shape (sheet-like shape), a net-like shape, a punching-metal shape, an expanded-metal shape, or the like as appropriate. The positive electrode current collector 401 preferably has a thickness of greater than or equal to 10 μm and less than or equal to 30 μm.

Examples of the undercoat include a mixture of graphite and sodium polyacrylate (PAA) and a mixture of acetylene black (AB) and PVDF. The compounding ratio of graphite to PAA is preferably 95:5 to 50:50, and the compounding ratio of AB to PVDF is preferably 70:30 to 50:50.

Figure 6C:
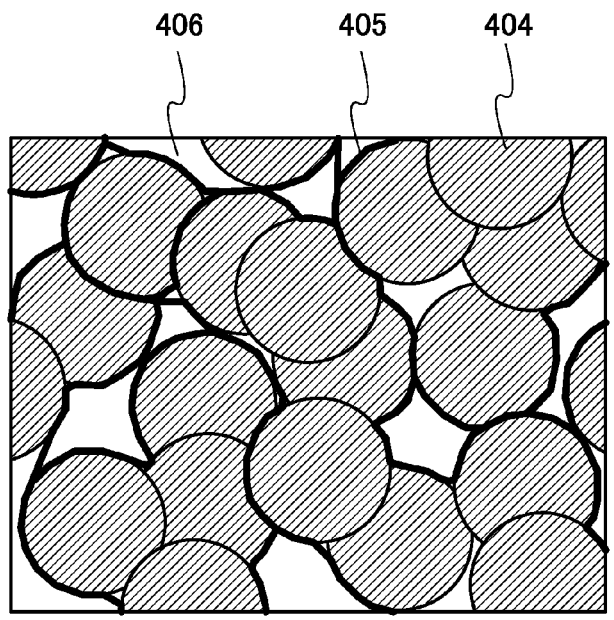

FIG. 6C is a schematic view illustrating a longitudinal cross section of the positive electrode active material layer 402. The positive electrode active material layer 402 includes positive electrode active material particles 404, graphene flakes 405 as a conductive additive, and a binder 406.

Examples of the conductive additive are acetylene black (AB), ketjen black, graphite (black lead) particles, and carbon nanotubes. Here, the positive electrode active material layer 402 using the graphene flakes 405 is described.

The positive electrode active material particles 404 are made of secondary particles having an average particle diameter or a particle diameter distribution, which are obtained in such a way that material compounds are mixed at a predetermined ratio and baked and the resulting baked product is crushed, granulated, and classified by an appropriate means. Therefore, the positive electrode active material particles 404 are schematically illustrated as spheres in FIG. 6C; however, the shape of the positive electrode active material particle 404 is not limited to this shape.

For the positive electrode active material particles 404, a material into/from which lithium ions can be inserted and extracted can be used. For example, a material with an olivine crystal structure, a layered rock-salt crystal structure, or a spinel crystal structure can be used.

As an olivine-type compound, a compound represented by $LiMPO_4$ (general formula) (M is one or more of Fe(II), Mn(II), Co(II), and Ni(II)) can be given. Typical examples of $LiMPO_4$ (general formula) are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

$LiFePO_4$ is particularly preferable because it properly has properties necessary for the positive electrode active material, such as safety, stability, high capacity density, high potential, and the existence of lithium ions which can be extracted in initial oxidation (charge).

Examples of a material with a layered rock-salt crystal structure are lithium cobalt oxide ($LiCoO_2$), $LiNiO_2$, $LiMnO_2$, $Li_2MnO_3$, NiCo-containing complex oxide (general formula: $LiNi_xCo_{1-x}O_2$ (0<x<1)) such as $LiNi_{0.8}Co_{0.2}O_2$, NiMn-containing complex oxide (general formula: $LiNi_xMn_{1-x}O_2$ (0<x<1)) such as $LiNi_{0.5}Mn_{0.5}O_2$, NiMnCo-containing composite complex oxide (also referred to as NMC) (general formula: $LiNi_xMn_yCo_{1-x-y}O_2$ (x>0, y>0, x+y<1)) such as $LiNi_{1/3}Mn_{1/3}Co_{1/3}O_2$, $Li(Ni_{0.8}Co_{0.15}Al_{0.05})O_2$, and $Li_2MnO_3$—$LiMO_2$ (M=Co, Ni, or Mn).

$LiCoO_2$ is particularly preferable because of its advantages such as high capacity and stability in the air higher than that of $LiNiO_2$ and thermal stability higher than that of $LiNiO_2$.

Examples of a material with a spinel crystal structure are $LiMn_2O_4$, $Li_{1+x}Mn_{2-x}O_4$, $Li(MnAl)O_4$, and $LiMn_{1.5}Ni_{0.5}O_4$.

It is preferable to add a small amount of lithium nickel oxide ($LiNiO_2$ or $LiNi_{1-x}M_xO_2$ (M=Co, Al, or the like)) to a material with a spinel crystal structure which contains manganese, such as $LiMn_2O_4$, because advantages such as minimization of the elution of manganese and the decomposition of an electrolytic solution can be obtained.

Alternatively, a compound represented by $Li_{(2-j)}MSiO_4$ (general formula) (M is one or more of Fe(II), Mn(II), Co(II), and Ni(II), $0 \leq j \leq 2$) can be used for the positive electrode active material. Typical examples of $Li_{(2-j)}MSiO_4$ (general formula) are $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a NASICON compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the NASICON compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaF_3$ or $FeF_3$, a metal chalcogenide (a sulfide, a selenide, or a telluride) such as $TiS_2$ or $MoS_2$, a material with an inverse spinel crystal structure such as $LiMVO_4$, a vanadium oxide ($V_2O_5$, $V_6O_{13}$, $LiV_3O_8$, or the like), a manganese oxide, an organic sulfur compound can be used as the positive electrode active material.

In the case where carrier ions are alkali metal ions other than lithium ions, or alkaline-earth metal ions, the positive electrode active material particles 404 may be formed using, instead of the above compound or oxide containing lithium, a compound or oxide containing an alkali metal (e.g., sodium or potassium), or an alkaline-earth metal (e.g., calcium, strontium, barium, beryllium, or magnesium).

Note that although not illustrated, a carbon layer may be provided on a surface of the positive electrode active material particle 404. A carbon layer provided on a surface of the positive electrode active material particle 404 can increase the electric conductivity of the electrode. The positive electrode active material particle 404 can be coated with a carbon layer by mixing a carbohydrate such as glucose into the positive electrode active material particle in baking the positive electrode active material particle.

In addition, the graphene flake 405 that is added as a conductive additive to the positive electrode active material layer 402 can be formed by reducing graphene oxide as described in Embodiment 1.

Graphene oxide can be formed by an oxidation method called a Hummers method, for example.

The Hummers method is as follows: a sulfuric acid solution of potassium permanganate, a hydrogen peroxide solution, or the like is mixed into graphite powder to cause oxidation reaction; thus, a dispersion containing a graphite oxide is formed. Through the oxidation of carbon of graphite, functional groups such as an epoxy group, a carbonyl group, a carboxyl group, or a hydroxyl group are bonded in the graphite oxide. Accordingly, the interlayer distance between adjacent graphene layers of a plurality of graphene layers in graphite oxide is longer than the interlayer distance of graphite, so that the graphite oxide can be easily separated into thin pieces by interlayer separation. Then, ultrasonic vibration is applied to the mixed solution containing the graphite oxide, so that the graphite oxide whose interlayer distance is long can be cleaved to separate graphene oxide and to form a dispersion containing the graphene oxide. The solvent is removed from the dispersion containing the graphene oxide, so that powdery graphene oxide can be obtained.

Note that a method for forming graphene oxide is not limited to the Hummers method using a sulfuric acid solution of potassium permanganate; for example, the Hummers method using nitric acid, potassium chlorate, sodium nitrate, potassium permanganate, or the like or a method for forming graphene oxide other than the Hummers method may be employed as appropriate.

The graphite oxide may be separated into thin pieces by application of ultrasonic vibration, by irradiation with microwaves, radio waves, or thermal plasma, or by application of physical stress.

The formed graphene oxide has an epoxy group, a carbonyl group, a carboxyl group, a hydroxyl group, or the like. In graphene oxide in a polar solvent typified by NMP, oxygen in a functional group is negatively charged; hence, while interacting with NMP, graphene oxide flakes repel each other and do not easily aggregate. Accordingly, graphene oxide flakes in a polar solvent can be easily dispersed uniformly.

The length of one side (also referred to as a flake size) of the graphene oxide is greater than or equal to 50 nm and less than or equal to 100 μm, preferably greater than or equal to 800 nm and less than or equal to 20 μm.

As in the cross-sectional view of the positive electrode active material layer 402 in FIG. 6C, a plurality of the positive electrode active material particles 404 are coated with a plurality of the graphene flakes 405. One sheet-like graphene flake 405 is connected to a plurality of the positive electrode active material particles 404. In particular, since the graphene flake 405 is in the form of a sheet, surface contact can be made in such a way that the surfaces of the positive electrode active material particles 404 are partly wrapped with the graphene flake 405. Unlike a conductive additive in the form of particles, such as acetylene black, which makes point contact with a positive electrode active material, the graphene flakes 405 are capable of surface contact with low contact resistance; accordingly, the electron conductivity of the positive electrode active material particles 404 and the graphene flakes 405 can be improved without an increase in the amount of a conductive additive.

Further, surface contact is made between the plurality of graphene flakes 405. This is because graphene oxides with exceptional dispersibility in a polar solvent are used for the formation of the graphene flakes 405. A solvent is removed by evaporation from a polar solvent including graphene oxide flakes uniformly dispersed and the graphene oxide is converted into graphene; hence, the graphene flakes 405 remaining in the positive electrode active material layer 402 partly overlap with each other and are dispersed such that surface contact is made, thereby forming an electron conduction path.

Some of the graphene flakes 405 are provided between the positive electrode active material particles 404. Further, the graphene flake 405 is an extremely thin film (sheet) made of a single layer of carbon molecules or stacked layers thereof and thus is in contact with part of the surfaces of the positive electrode active material particles 404 in such a way as to trace these surfaces. A portion of the graphene flake 405 which is not in contact with the positive electrode active material particles 404 is warped between the positive electrode active material particles 404 and crimped or stretched.

Consequently, the plurality of graphene flakes 405 form an electron conduction network in the positive electrode 400. This maintains a path for electric conduction between the positive electrode active material particles 404. Thus, when graphene oxide is used as a raw material and reduction of graphene oxide is performed after formation of the electrode, graphene as a conductive additive is produced. Accordingly, the positive electrode active material layer 402 with high electron conductivity can be formed.

Further, the percentage of the positive electrode active material particles 404 in the positive electrode active material layer 402 can be increased because it is not necessary to increase the additive amount of a conductive additive to increase contact points between the positive electrode active material particles 404 and the graphene flakes 405. This can increase the discharge capacity of the battery cell.

The average diameter of a primary particle of the positive electrode active material particles 404 is less than or equal to 500 nm, preferably greater than or equal to 50 nm and less than or equal to 500 nm. To make surface contact with a plurality of the positive electrode active material particles 404, the graphene flakes 405 preferably have sides the length of each of which is greater than or equal to 50 nm and less than or equal to 100 µm, more preferably greater than or equal to 800 nm and less than or equal to 20 µm.

As the binder 406 in the positive electrode active material layer 402, polyvinylidene fluoride (PVDF) as a typical example, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose, or the like can be used.

The above positive electrode active material layer 402 preferably includes the positive electrode active material particles 404 at greater than or equal to 90 wt % and less than or equal to 94 wt %, the graphene flakes 405 as a conductive additive at greater than or equal to 1 wt % and less than or equal to 5 wt %, and the binder at greater than or equal to 1 wt % and less than or equal to 5 wt % with respect to the total weight of the positive electrode active material layer 402.

Next, a negative electrode of a battery cell will be described with reference to FIGS. 7A to 7C.

Figure 7A:
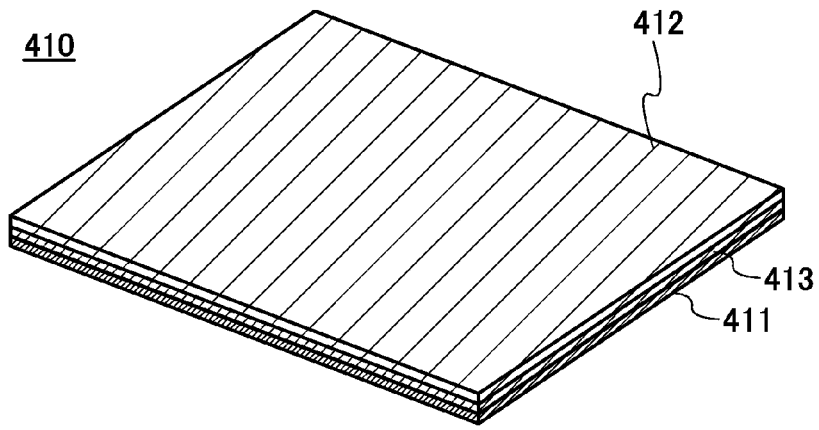
FIGS. 7A to 7C illustrate a negative electrode.
Figure 7B:
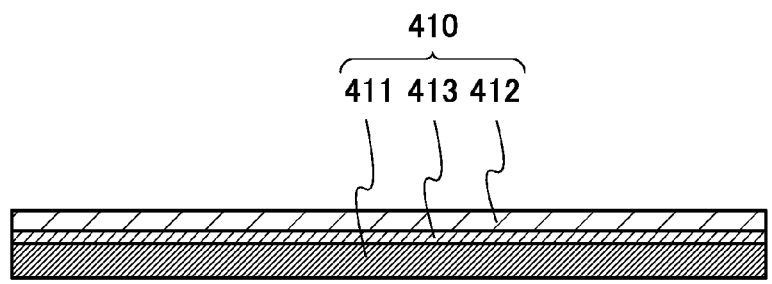
Figure 7C:
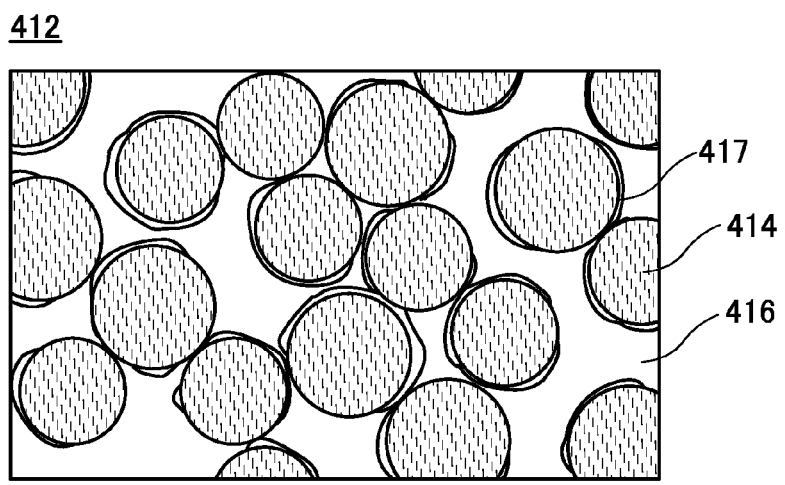

FIG. 7A is a perspective view of the negative electrode 410, and FIG. 7B is a cross-sectional view of the negative electrode 410. The negative electrode 410 includes a negative electrode current collector 411 and a negative electrode active material layer 412 formed over the negative electrode current collector 411 by a coating method, a CVD method, a sputtering method, or the like, for example. Further, an undercoat 413 is provided between the negative electrode current collector 411 and the negative electrode active material layer 412. Although FIG. 7A illustrates an example of providing the negative electrode active material layer 412 over one of surfaces of the negative electrode current collector 411 with a sheet shape (or a strip-like shape), one embodiment of the present invention is not limited to this example. The negative electrode active material layers 412 may be provided so that the negative electrode current collector 411 is sandwiched therebetween. Further, although the negative electrode active material layer 412 is provided over the whole negative electrode current collector 411 in FIG. 7A, the negative electrode active material layer 412 may be provided over part of the negative electrode current collector 411. For example, a structure may be employed in which the negative electrode active material layer 412 is not provided in a portion where the negative electrode current collector 411 is connected to a negative electrode tab.

The negative electrode current collector 411 can be formed using a material which has high electric conductivity and is not alloyed with a carrier ion of lithium or the like, such as a metal typified by stainless steel, gold, platinum, zinc, iron, copper, or titanium or an alloy thereof. Alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The negative electrode current collector 411 can have a foil-like shape, a plate-like shape (sheet-like shape), a net-like shape, a punching-metal shape, an expanded-metal shape, or the like as appropriate. The negative electrode current collector 411 preferably has a thickness of 10 µm to 30 µm inclusive.

FIG. 7B schematically illustrates part of a cross section of the negative electrode active material layer 412. Although the negative electrode active material layer 412 includes a negative electrode active material 414 and a binder 416 in this embodiment, one embodiment of the present invention is not limited to this; the negative electrode active material layer 412 includes at least the negative electrode active material 414.

A material with which lithium can be dissolved and precipitated or a material into and from which lithium ions can be inserted and extracted can be used for the negative electrode active material 414; for example, a lithium metal, a carbon-based material, or an alloy-based materia can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as me so-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active material 414, an alloy-based material which enables charge-discharge reactions by an alloying reaction and a dealloying reaction with lithium can be used. In the case where carrier ions are lithium ions, a material containing at least one of Al, Si, Ge, Sn, Pb, Sb, Bi, Ag, Zn, Cd, In, Ga, and the like can be used for example. Such elements have higher capacity than carbon. In particular, silicon has a significantly high theoretical capacity of 4200 mAh/g. For this reason, silicon is preferably used as the negative electrode active material 414. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active material 414, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material 414, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAb/g and 1890 mAh/cm$^3$).

A nitride containing lithium and a transition metal is preferably used, in which case lithium ions are contained in the negative electrode active material 414 and thus the negative electrode active material 414 can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material 414; for example, a transition metal oxide which does not cause an alloy reaction with lithium, such as cobalt oxide (CoO), nickel oxide (NiO), or iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as the positive electrode active material particles 404 because of its high potential.

Although the negative electrode active material 414 is illustrated as a particulate substance in FIG. 7B, the shape of the negative electrode active material 414 is not limited thereto. The negative electrode active material 414 can have a given shape such as a plate shape, a rod shape, a cylindrical shape, a powder shape, or a flake shape. Further, the negative electrode active material 414 may have a three-dimensional shape such as unevenness on a surface of a plate shape, fine unevenness on a surface, or a porous shape.

The negative electrode active material layer 412 may be formed by a coating method in the following manner: a conductive additive (not illustrated) or a binding agent is added to the negative electrode active material 414 to form a negative electrode paste; and the negative electrode paste is applied to the negative electrode current collector 411 and dried.

The negative electrode active material layer 412 may be predoped with lithium. Predoping refers to a method for making carrier ions be adsorbed in advance onto a compound that does not include carrier ions. The negative electrode active material layer 412 may be predoped with lithium in such a manner that, for example, a lithium layer is formed on a surface of the negative electrode active material layer 412 by a sputtering method. Alternatively, lithium foil is provided on the surface of the negative electrode active material layer 412, whereby the negative electrode active material layer 412 can be predoped with lithium.

Further, graphene (not illustrated) is preferably formed on the surface of the negative electrode active material 414. For example, in the case of using silicon as the negative electrode active material 414, reception and release of carrier ions in charge and discharge cycles greatly change the volume of silicon. This decreases adhesion between the negative electrode current collector 411 and the negative electrode active material layer 412, resulting in degradation of battery characteristics caused on charge and discharge. In view of this, graphene is preferably formed on the surface of the negative electrode active material 414 containing silicon because this makes it possible to inhibit a decrease in adhesion between the negative electrode current collector 411 and the negative electrode active material layer 412 due to a change in the volume of silicon in charge and discharge cycles, which helps reduce degradation of battery characteristics.

Graphene formed on the surface of the negative electrode active material 414 can be formed by reducing graphene oxide as described in Embodiment 1 in a manner similar to that of the method for forming the positive electrode. As the graphene oxide, the above-described graphene oxide can be used.

Further, a coating film 417 of an oxide or the like may be formed on the surface of the negative electrode active material 414. A surface film formed by decomposition of an electrolytic solution, or the like in charging cannot release electric charge used in the formation, and therefore forms irreversible capacity. In contrast, the film of an oxide or the like provided on the surface of the negative electrode active material 414 in advance can reduce or prevent generation of irreversible capacity.

As the coating film 417 covering the negative electrode active material 414, an oxide film of any one of niobium, titanium, vanadium, tantalum, tungsten, zirconium, molybdenum, hafnium, chromium, aluminum, and silicon and an oxide film containing lithium and any one of these elements can be used. The coating film 417 formed using such a film is sufficiently dense as compared with a conventional surface film formed on the surface of a negative electrode by a decomposition product of an electrolytic solution.

The product of the electric resistivity and the thickness of the coating film 417 at 25° C. is greater than or equal to 20 Ω·m·m, preferably greater than or equal to 200 Ω·m·m. When the product of the electric resistivity and the thickness of the coating film 417 at 25° C. is greater than or equal to 20 Ω·m·m, the decomposition reaction between the negative electrode active material and an electrolytic solution can be reduced. Further, when the product of the electric resistivity and the thickness of the coating film 417 at 25° C. is greater than or equal to 200 Ω·m·m, the decomposition reaction between the negative electrode active material and an electrolytic solution can be inhibited.

A sol-gel method can be employed to form the coating film 417 covering the negative electrode active material 414, for example. The sol-gel method is a method for forming a thin film in such a manner that a solution of metal alkoxide, a metal salt, or the like (also referred to as a treatment liquid) is changed into a gel that has lost its fluidity by a hydrolysis reaction and a polycondensation reaction and the gel is baked. Since a thin film is formed from a liquid phase in the sol-gel method, raw materials can be mixed uniformly on the molecular scale. For this reason, by adding a negative electrode active material such as graphite to a raw material of a metal oxide film, the active material can be easily dispersed into the gel. In such a manner, the coating film 417 can be formed on the surface of the negative electrode active material 414.

Alternatively, the coating film covering the negative electrode active material 414 may be formed in such a manner that a conductive additive and/or a binder is added to the negative electrode active material 414 to form a negative electrode paste, the negative electrode paste is applied to the negative electrode current collector 411 and dried to form a coated electrode, the coated electrode is immersed in a treatment liquid, and then a hydrolysis reaction and a polycondensation reaction occur. This method allows a plurality of negative electrode active material particles to be in contact with each other and permits the coating film to cover part or the whole of the surface except a region where the plurality of negative electrode active material particles are in contact with each other. This can inhibit the reduction decomposition of an electrolytic solution, inhibiting formation of a decomposition product of the electrolytic solution on the negative electrode active material particles due to the reduction decomposition of the electrolytic solution.

The use of the coating film 417 can prevent a decrease in the capacity of a power storage device.

As a separator included in the battery cell, a porous insulator such as cellulose (paper), polypropylene (PP), polyethylene (PE), polybutene, nylon, polyester, polysulfone, polyacrylonitrile, polyvinylidene fluoride, or tetrafluoroethylene can be used. Alternatively, nonwoven fabric of a glass fiber or the like, or a diaphragm in which a glass fiber and a polymer fiber are mixed may be used.

The electrolytic solution used for the battery cell contains an electrolyte and an electrolyte solvent.

As a solvent for the electrolytic solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is added as the solvent for the electrolytic solution, safety against liquid leakage and the like is improved. Further, a battery cell can be thinner and more lightweight. Typical examples of the gelled high-molecular material include a silicone gel, an acrylic gel, an acrylonitrile gel, polyethylene oxide, polypropylene oxide, a fluorine-based polymer, and the like.

Alternatively, the use of one or more of ionic liquids (room temperature ionic liquids) that has non-flammability and non-volatility as the solvent for the electrolytic solution can prevent a battery cell from exploding or catching fire even when the battery cell internally shorts out or the internal temperature increases due to overcharging or the like. Thus, the safety of the battery cell can be increased. With the use of the ionic liquid as the solvent for the electrolytic solution, the battery cell can favorably operate even in a low temperature range (sub-zero temperature range) as compared with the case where an organic solvent is used as the solvent for the electrolytic solution.

As an electrolyte dissolved in the above solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

Although the case where carrier ions are lithium ions in the above electrolyte is described, carrier ions other than lithium ions can be used. Note that when carrier ions other than lithium ions are alkali metal ions or alkaline-earth metal ions, instead of lithium in the above lithium salts, an alkali metal (e.g., sodium or potassium), an alkaline-earth metal (e.g., calcium, strontium, barium, beryllium, or magnesium) may be used for an electrolyte.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator is not necessary. Further, the battery can be entirely solidified; therefore, there is no possibility of liquid leakage and thus the safety of the battery is increased.

Next, the structure of a battery cell that can be used for a power storage device will be described with reference to FIGS. 8A to 8C.

Figure 8A:
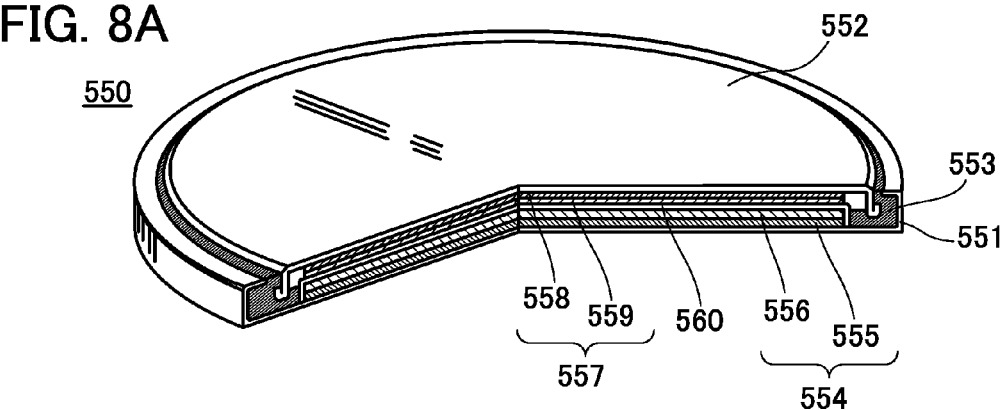
FIGS. 8A to 8C illustrate a secondary battery.

FIG. 8A is an external view of a coin-type (single-layer flat type) lithium-ion battery cell, part of which illustrates a cross-sectional view of part of the coin-type lithium-ion battery cell.

In a coin-type battery cell 550, a positive electrode can 551 doubling as a positive electrode terminal and a negative electrode can 552 doubling as a negative electrode terminal are insulated from each other and sealed by a gasket 553 made of polypropylene or the like. A positive electrode 554 includes a positive electrode current collector 555 and a positive electrode active material layer 556 provided in contact with the positive electrode current collector 555. A negative electrode 557 includes a negative electrode current collector 558 and a negative electrode active material layer 559 provided in contact with the negative electrode current collector 558. A separator 560 and an electrolytic solution (not illustrated) are provided between the positive electrode active material layer 556 and the negative electrode active material layer 559.

The negative electrode 557 includes the negative electrode current collector 558 and the negative electrode active material layer 559. The positive electrode 554 includes the positive electrode current collector 555 and the positive electrode active material layer 556.

For the positive electrode 554, the negative electrode 557, the separator 560, and the electrolytic solution, the above-described members can be used.

For the positive electrode can 551 and the negative electrode can 552, a metal having corrosion resistance to an electrolytic solution, such as nickel, aluminum, or titanium, an alloy of such a metal, or an alloy of such a metal and another metal (e.g., stainless steel or the like) can be used. Alternatively, the positive electrode can 551 and the negative electrode can 552 are preferably covered with nickel, aluminum, or the like in order to prevent corrosion caused by the electrolytic solution. The positive electrode can 551 and the negative electrode can 552 are electrically connected to the positive electrode 554 and the negative electrode 557, respectively.

The negative electrode 557, the positive electrode 554, and the separator 560 are immersed in the electrolytic solution. Then, as illustrated in FIG. 8A, the positive electrode can 551, the positive electrode 554, the separator 560, the negative electrode 557, and the negative electrode can 552 are stacked in this order with the positive electrode can 551 positioned at the bottom, and the positive electrode can 551 and the negative electrode can 552 are subjected to pressure bonding with the gasket 553 interposed therebetween. In such a manner, the coin-type battery cell 550 is fabricated.

It is preferable that, for example, a graphite electrode and lithium iron phosphate ($LiFePO_4$) be used for the negative electrode 557 and an active material of the positive electrode 554 of the battery cell 550, respectively.

Next, an example of a laminated battery cell will be described with reference to FIG. 8B. In FIG. 8B, a structure inside the laminated battery cell is partly exposed for convenience.

Figure 8B:
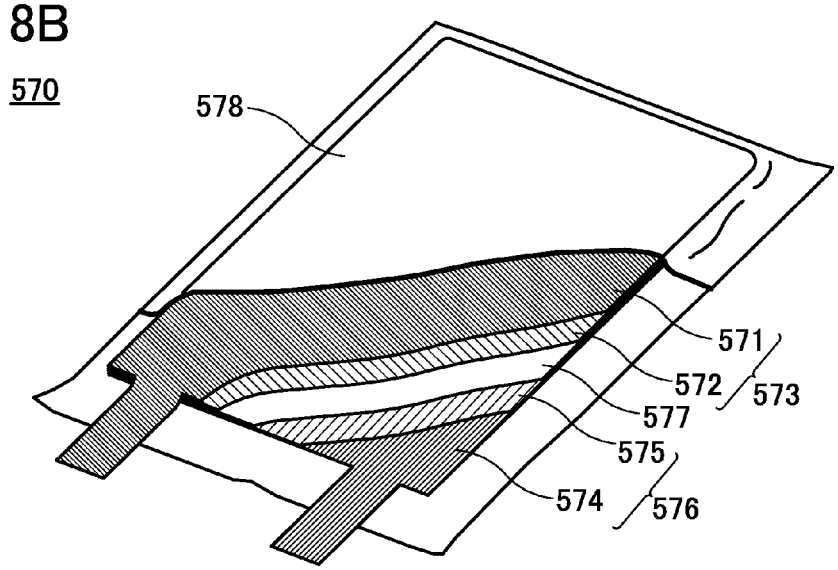
Figure 8C:
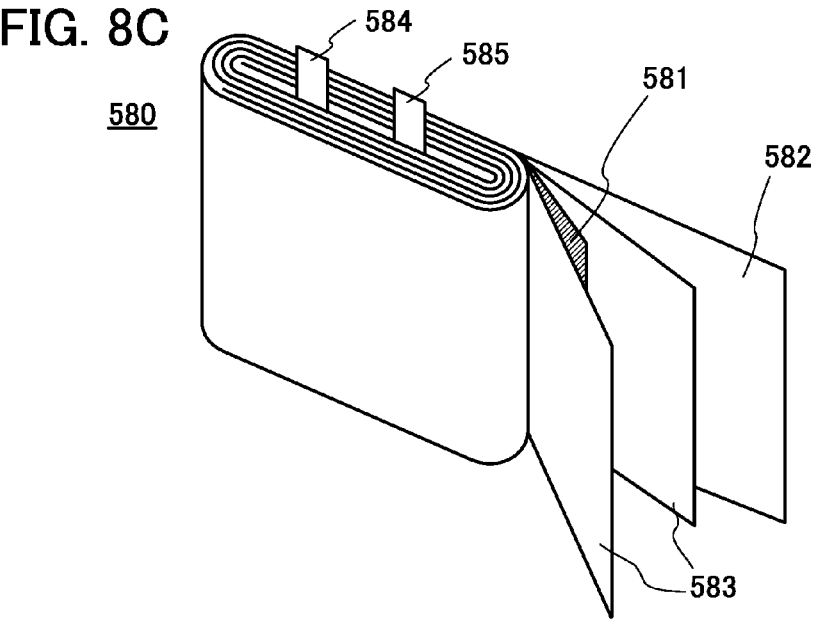

A laminated battery 570 using a laminate film as an exterior body and illustrated in FIG. 8B includes a positive electrode 573 including a positive electrode current collector 571 and a positive electrode active material layer 572, a negative electrode 576 including a negative electrode current collector 574 and a negative electrode active material layer 575, a separator 577, an electrolytic solution (not illustrated), and an exterior body 578. The separator 577 is provided between the positive electrode 573 and the negative electrode 576 in the exterior body 578. The exterior body 578 is filled with the electrolytic solution. Although the one positive electrode 573, the one negative electrode 576, and the one separator 577 are used in FIG. 8B, the battery cell may have a layered structure in which positive electrodes and negative electrodes are alternately stacked and separated by separators.

For the positive electrode 573, the negative electrode 576, the separator 577, and the electrolytic solution (an electrolyte and a solvent), the above-described members can be used.

In the laminated battery 570 illustrated in FIG. 8B, the positive electrode current collector 571 and the negative electrode current collector 574 also serve as terminals (tabs) for an electrical contact with an external portion. For this reason, each of the positive electrode current collector 571 and the negative electrode current collector 574 is arranged so that part of the positive electrode current collector 571 and part of the negative electrode current collector 574 are exposed on the outside the exterior body 578.

As the exterior body 578 in the laminated battery 570, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. With such a three-layer structure, permeation of the electrolytic solution and a gas can be blocked and an insulating property can be obtained.

Next, an example of a rectangular battery cell will be described with reference to FIG. 8C. A wound body 580 illustrated in FIG. 8C includes a negative electrode 581, a positive electrode 582, and a separator 583. The wound body 580 is obtained by winding a sheet of a stack in which the negative electrode 581 overlaps with the positive electrode 582 with the separator 583 provided therebetween. The wound body 580 is covered with a rectangular sealing can or the like; thus, a rectangular battery cell is fabricated. Note that the number of stacks each including the negative electrode 581, the positive electrode 582, and the separator 583 may be determined as appropriate depending on required capacity of the battery cell and the volume of a cell.

As in a cylindrical battery cell, in the rectangular battery cell, the negative electrode 581 is connected to a negative electrode tab (not illustrated) through one of a terminal 584 and a terminal 585, and the positive electrode 582 is connected to a positive electrode tab (not illustrated) through the other of the terminal 584 and the terminal 585.

Although the coin-type battery cell, the laminated battery cell, and the rectangular battery cell are described above as examples of the battery cell, battery cells with a variety of shapes can be used. Further, a structure in which a plurality of positive electrodes, a plurality of negative electrodes, and a plurality of separators are stacked or wound may be employed.

The use of the storage battery electrode of one embodiment of the present invention as either or both of the positive electrode and the negative electrode of the battery cell can increase the capacity of the battery cell.

Further, a power storage device can be fabricated using a plurality of the battery cells of one embodiment of the present invention.

This embodiment can be freely combined with any of the other embodiments.

Embodiment 4

The battery cell of one embodiment of the present invention and a power storage device including a plurality of the battery cells can be used for power supplies of a variety of electrical devices driven by power.

Specific examples of electrical devices each utilizing the power storage device of one embodiment of the present invention are as follows: display devices of televisions, monitors, and the like, lighting devices, desktop personal computers and laptop personal computers, word processors, image reproduction devices which reproduce still images and moving images stored in recording media such as digital versatile discs (DVDs), portable CD players, portable radios, tape recorders, headphone stereos, stereos, table clocks, wall clocks, cordless phone handsets, transceivers, portable wireless devices, mobile phones, car phones, portable game machines, calculators, portable information terminals, electronic notebooks, e-book readers, electronic translators, audio input devices, video cameras, digital still cameras, toys, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electrical tools such as a chain saw, smoke detectors, and medical equipment such as dialyzers. Further, industrial equipment such as guide lights, traffic lights, belt conveyors, elevators, escalators, industrial robots, power storage systems, and power storage devices for leveling the amount of power supply and smart grid can be given. In addition, moving objects driven by electric motors using electric power from the power storage devices are also included in the category of electrical devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the electrical devices, the power storage device of one embodiment of the present invention can be used as a main power supply for supplying enough electric power for almost the whole power consumption. Alternatively, in the electrical devices, the power storage device of one embodiment of the present invention can be used as an uninterruptible power supply which can supply electric power to the electrical devices when the supply of electric power from the main power supply or a commercial power supply is stopped. Still alternatively, in the electrical devices, the power storage device of one embodiment of the present invention can be used as an auxiliary power supply for supplying electric power to the electrical devices at the same time as the power supply from the main power supply or a commercial power supply.

Figure 9:
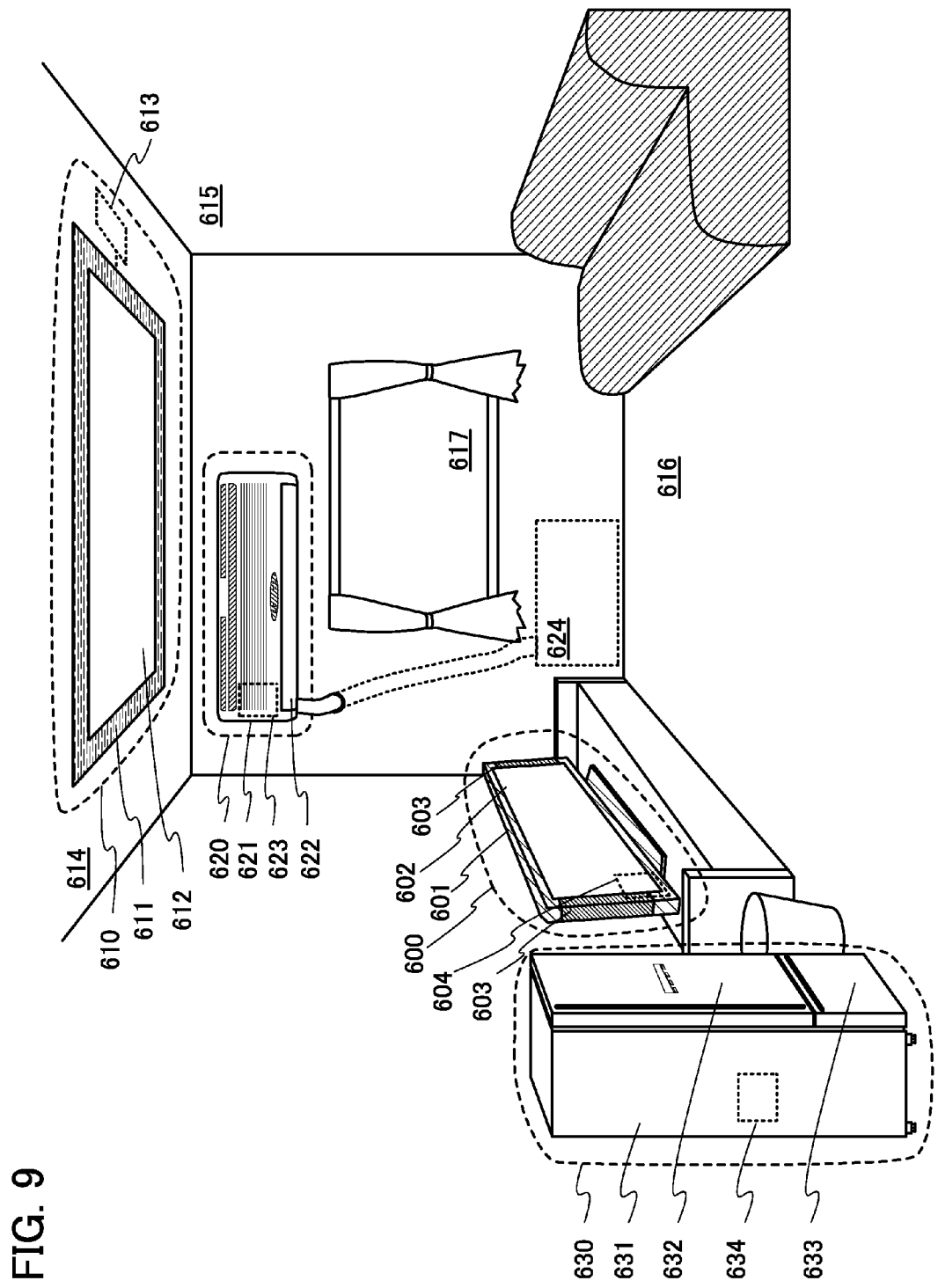
FIG. 9 illustrates electrical devices.

FIG. 9 illustrates specific structures of the electrical devices. In FIG. 9, a display device 600 is an example of an electrical device including a power storage device 604 of one embodiment of the present invention. Specifically, the display device 600 corresponds to a display device for TV broadcast reception and includes a housing 601, a display portion 602, speaker portions 603, and the power storage device 604. The power storage device 604 of one embodiment of the present invention is provided in the housing 601. The display device 600 can receive electric power from a commercial power supply. Alternatively, the display device 600 can use electric power stored in the power storage device 604 including the storage battery electrode of one embodiment of the present invention. Thus, the display device 600 can be operated with the use of the power storage device 604 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 602.

Note that the display device includes, in its category, all of information display devices for personal computers, advertisement displays, and the like besides TV broadcast reception.

In FIG. 9, an installation lighting device 610 is an example of an electrical device including a power storage device 613 of one embodiment of the present invention. Specifically, the lighting device 610 includes a housing 611, a light source 612, and the power storage device 613. Although FIG. 9 illustrates the case where the power storage device 613 is provided in a ceiling 614 on which the housing 611 and the light source 612 are installed, the power storage device 613 may be provided in the housing 611. The lighting device 610 can receive electric power from a commercial power supply. Alternatively, the lighting device 610 can use electric power stored in the power storage device 613. Thus, the lighting device 610 can be operated with the use of power storage device 613 of one embodiment of the present invention as an uninterruptible power supply even when electric power cannot be supplied from a commercial power supply due to power failure or the like.

Note that although the installation lighting device 610 provided in the ceiling 614 is illustrated in FIG. 9 as an example, the power storage device of one embodiment of the present invention can be used in an installation lighting device provided in, for example, a wall 615, a floor 616, a window 617, or the like other than the ceiling 614. Alternatively, the storage battery including the electrode of one embodiment of the present invention can be used in a tabletop lighting device or the like.

As the light source 612, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 9, an air conditioner including an indoor unit 620 and an outdoor unit 624 is an example of an electrical device including a power storage device 623 of one embodiment of the present invention. Specifically, the indoor unit 620 includes a housing 621, an air outlet 622, and the power storage device 623. Although FIG. 9 illustrates the case where the power storage device 623 is provided in the indoor unit 620, the power storage device 623 may be provided in the outdoor unit 624. Alternatively, the power storage devices 623 may be provided in both the indoor unit 620 and the outdoor unit 624. The air conditioner can receive electric power from a commercial power supply. Alternatively, the air conditioner can use electric power stored in the power storage device 623. Particularly in the case where the power storage devices 623 are provided in both the indoor unit 620 and the outdoor unit 624, the air conditioner can be operated with the use of the power storage device 623 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 9 as an example, the power storage device of one embodiment of the present invention can be used in an air conditioner in which the functions of an indoor unit and an outdoor unit are integrated in one housing.

In FIG. 9, an electric refrigerator-freezer 630 is an example of an electrical device including a power storage device 634 of one embodiment of the present invention. Specifically, the electric refrigerator-freezer 630 includes a housing 631, a door for a refrigerator 632, a door for a freezer 633, and the power storage device 634. The power storage device 634 is provided in the housing 631 in FIG. 9. The electric refrigerator-freezer 630 can receive electric power from a commercial power supply. Alternatively, the electric refrigerator-freezer 630 can use electric power stored in the power storage device 634. Thus, the electric refrigerator-freezer 630 can be operated with the use of the power storage device 634 of one embodiment of the present invention as an uninterruptible power supply even when electric power cannot be supplied from a commercial power supply due to power failure or the like.

Note that among the electrical devices described above, a high-frequency heating apparatus such as a microwave oven and an electrical device such as an electric rice cooker require high power in a short time. The tripping of a breaker of a commercial power supply in use of an electrical device can be prevented by using the power storage device of one embodiment of the present invention as an auxiliary power supply for supplying electric power which cannot be supplied enough by a commercial power supply.

In addition, in a time period when electrical devices are not used, particularly when the percentage of the amount of electric power which is actually used to the total amount of electric power which can be supplied from a commercial power supply source (such a percentage referred to as a usage rate of electric power) is low, electric power can be stored in the power storage device, whereby the usage rate of electric power can be reduced in a time period when the electrical devices are used. For example, in the case of the electric refrigerator-freezer 630, electric power can be stored in the power storage device 634 in night time when the temperature is low and the door for a refrigerator 632 and the door for a freezer 633 are not often opened or closed. On the other hand, in daytime when the temperature is high and the door for a refrigerator 632 and the door for a freezer 633 are frequently opened and closed, the power storage device 634 is used as an auxiliary power supply; thus, the usage rate of electric power in daytime can be reduced.

This embodiment can be implemented in combination with any of the other embodiments as appropriate.

Embodiment 5

Next, a portable information terminal which is an example of electrical devices will be described with reference to FIGS. 10A to 10C.

Figure 10A:
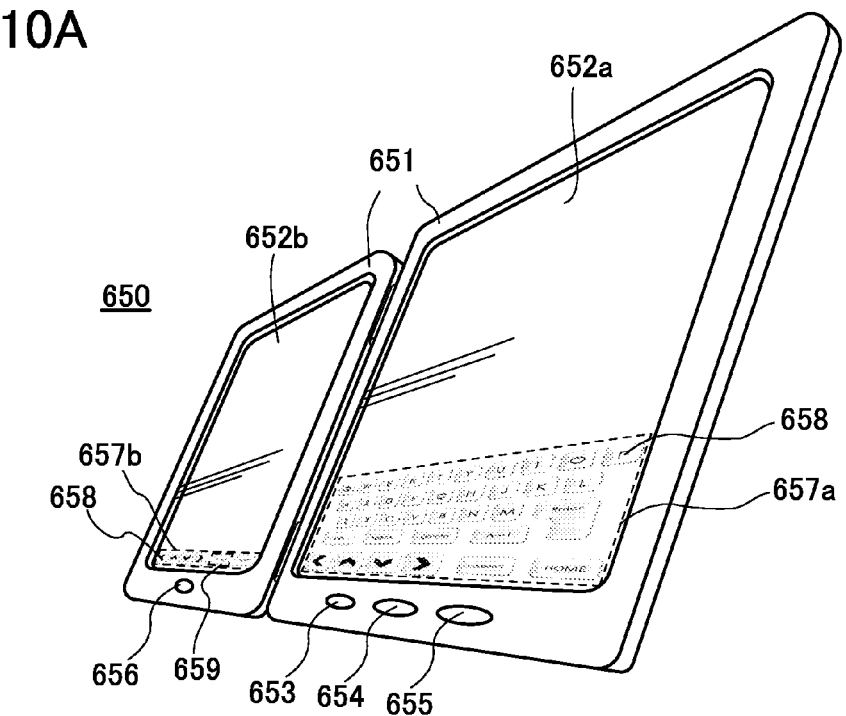
FIGS. 10A to 10C illustrate an electrical device.
Figure 10B:
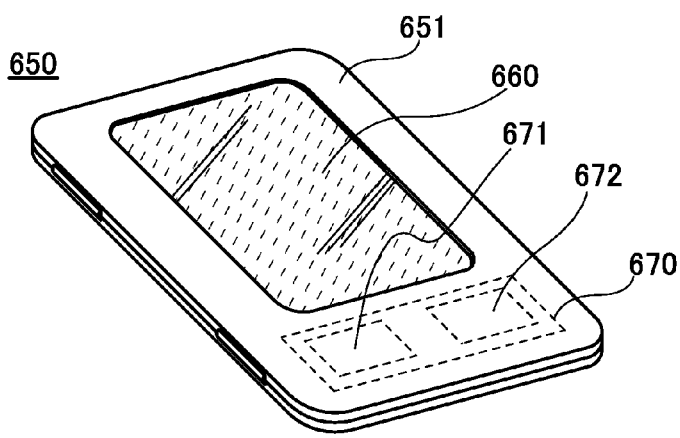

FIGS. 10A and 10B illustrate a tablet terminal 650 which can be folded. FIG. 10A illustrates the tablet terminal 650 in the state of being unfolded. The tablet terminal includes a housing 651, a display portion 652a, a display portion 652b, a display-mode switching button 653, a power button 654, a power-saving-mode switching button 655, and an operation button 656.

A touch panel area 657a can be provided in part of the display portion 652a, in which area, data can be input by touching displayed operation keys 658. Note that half of the display portion 652a has only a display function and the other half has a touch panel function. However, the structure of the display portion 652a is not limited to this, and all the area of the display portion 652a may have a touch panel function. For example, a keyboard can be displayed on the whole display portion 652a to be used as a touch panel, and the display portion 652b can be used as a display screen.

A touch panel area 657b can be provided in part of the display portion 652b like in the display portion 652a. When a keyboard display switching button 659 displayed on the touch panel is touched with a finger, a stylus, or the like, a keyboard can be displayed on the display portion 652b.

The touch panel area 657a and the touch panel area 657b can be controlled by touch input at the same time.

The display-mode switching button 653 allows switching between a landscape mode and a portrait mode, color display and black-and-white display, and the like. The power-saving-mode switching button 655 allows optimizing the display luminance in accordance with the amount of external light in use which is detected by an optical sensor incorporated in the tablet terminal. In addition to the optical sensor, other detecting devices such as sensors for determining inclination, such as a gyroscope or an acceleration sensor, may be incorporated in the tablet terminal.

Although the display area of the display portion 652a is the same as that of the display portion 652b in FIG. 10A, one embodiment of the present invention is not particularly limited thereto. The display area of the display portion 652a may be different from that of the display portion 652b, and further, the display quality of the display portion 652a may be different from that of the display portion 652b. For example, one of the display portions 652a and 652b may display higher definition images than the other.

FIG. 10B illustrates the tablet terminal 650 in the state of being closed. The tablet terminal 650 includes the housing 651, a solar cell 660, a charge/discharge control circuit 670, a battery 671, and a DC-DC converter 672. FIG. 10B illustrates an example where the charge/discharge control circuit 670 includes the battery 671 and the DC-DC converter 672. The power storage device described in the above embodiment is used as the battery 671.

Since the tablet terminal can be folded, the housing 651 can be closed when the tablet terminal is not in use. Thus, the display portions 652a and 652b can be protected, which permits the tablet terminal 650 to have high durability and improved reliability for long-term use.

The tablet terminal illustrated in FIGS. 10A and 10B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 660, which is attached on a surface of the tablet terminal, can supply electric power to a touch panel, a display portion, an image signal processor, and the like. Note that the solar cell 660 can be provided on one or both surfaces of the housing 651 and thus the battery 671 can be charged efficiently. The use of the power storage device of one embodiment of the present invention as the battery 671 has advantages such as a miniaturized size.

The structure and operation of the charge/discharge control circuit 670 illustrated in FIG. 10B will be described with reference to a block diagram of FIG. 10C. FIG. 10C illustrates the solar cell 660, the battery 671, the DC-DC converter 672, a converter 673, switches SW1 to SW3, and the display portion 652. The battery 671, the DC-DC converter 672, the converter 673, and the switches SW1 to SW3 correspond to the charge and discharge control circuit 670 in FIG. 10B.

First, an example of operation in the case where electric power is generated by the solar cell 660 using external light will be described. The voltage of electric power generated by the solar cell 660 is raised or lowered by the DC-DC converter 672 so that the electric power has a voltage for charging the battery 671. When the display portion 652 is operated with the electric power from the solar cell 660, the switch SW1 is turned on and the voltage of the electric power is raised or lowered by the converter 673 to a voltage needed for operating the display portion 652. In addition, when display on the display portion 652 is not performed, the switch SW1 is turned off and the switch SW2 is turned on so that the battery 671 may be charged.

Although the solar cell 660 is described as an example of a power generation means, there is no particular limitation on the power generation means, and the battery 671 may be charged with any of the other means such as a piezoelectric element or a thermoelectric conversion element (Peltier element). For example, the battery 671 may be charged with a non-contact power transmission module capable of performing charging by transmitting and receiving electric power wirelessly (without contact), or any of the other charge means used in combination.

Figure 10C:
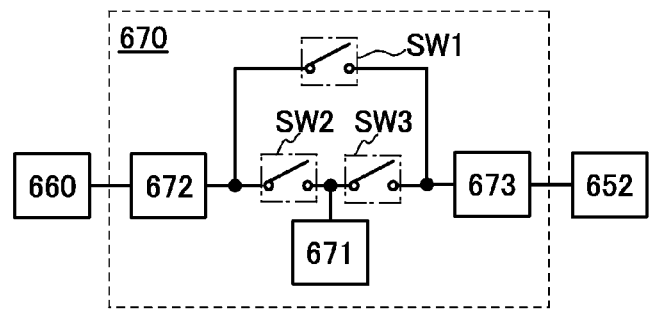

It is needless to say that one embodiment of the present invention is not limited to the electronic appliance illustrated in FIGS. 10A to 10C as long as the electronic appliance is equipped with the power storage device described in any of the above embodiments.

Example 1

The present invention will be specifically described below with examples. Note that the present invention is not limited to the following examples.

First, electrodes fabricated in this example will be described.

First, NMP was added as a polar solvent to LiFePO$_4$ which was formed by a solid phase method and was not coated with carbon and to which graphene oxide was added, and the mixture was kneaded until it had the consistency of thick paste. Note that "kneading" refers to mixing the mixture at high viscosity and is one of methods by which aggregation of graphene oxide and an active material can be easily loosened. After an NMP solution of PVDF (No. 1100 manufactured by KUREHA CORPORATION) was added as a binder to the mixture of graphene oxide and LiFePO$_4$, NMP was further added as a polar solvent and mixing was performed to form a slurry. The slurry formed by the above method was applied to a current collector formed by coating a 20-μm-thick aluminum film with approximately 1-μm-thick carbon black as an undercoat, and the slurry was dried at 80° C. in the air for 40 minutes. With the use of the above method, the plurality of electrodes in each of which an active material layer was formed over a current collector were fabricated.

Next, two kinds of reducing solutions used for reduction treatment were formed.

Reducing solution A was prepared by dissolving 77 mM ascorbic acid in ethanol. Reducing solution B was prepared by dissolving 77 mM ascorbic acid and 75 mM lithium hydroxide in an ethylene glycol solution (containing ethylene glycol at 80 vol %).

One of the electrodes was put into a beaker containing reducing solution A, and the electrode and reducing solution A were reacted with each other in a water bath at 60° C. for 4.5 hours. The obtained electrode is referred to as electrode A1.

One of the electrodes (with a width of approximately 2 cm and a length of approximately 5 cm) was attached to a bottle with a diameter of 40 mm so that no space is left therebetween, and approximately three turns of aluminum foil (with a thickness of 20 μm and a width of 10 cm) that was tense so as not to be bended were wound as a spacer around the bottle to which the electrode was attached. The electrode was located in the vicinity of the center of the width of the aluminum foil. The bottle to which the electrode was attached was immersed in reducing solution A, and the electrode and reducing solution A were reacted with each other in a water bath at 60° C. for 4.5 hours. The electrode is referred to as electrode A2.

One of the electrodes was put into a beaker containing reducing solution B, and the electrode and reducing solution B were reacted with each other in a water bath at 60° C. for 4.5 hours. The electrode is referred to as electrode B1.

One of the electrodes (with a width of approximately 2 cm and a length of approximately 5 cm) was attached to a bottle with a diameter of 40 mm so that no space is left therebetween, and approximately three turns of aluminum foil (with a thickness of 20 μm and a width of 10 cm) that was tense so as not to be bended were wound as a spacer around the bottle to which the electrode was attached. The electrode was located in the vicinity of the center of the width of the aluminum foil. The bottle to which the electrode was attached was immersed in reducing solution B for 2 hours, and then the electrode and reducing solution B were reacted with each other in a water bath at 60° C. for 4.5 hours. The electrode is referred to as electrode B2.

One of the electrodes (with a width of approximately 2 cm and a length of approximately 5 cm) was attached to a bottle with a diameter of 40 mm so that no space is left therebetween, and approximately one turn of cellulose separator TF40 (with a thickness of 50 μm and a width of 10 cm, manufactured by NIPPON KODOSHI CORPORATION) that was tense so as not to be bended was wound as a spacer around the bottle to which the electrode was attached. Further, approximately three turns of aluminum foil (with a thickness of 20 μm and a width of 10 cm) that was tense so as not to be bended were wound around the cellulose separator. The electrode was located in the vicinity of the center of the width of the aluminum foil. The bottle to which the electrode was attached was immersed in reducing solution A for 2 hours, and then the electrode and reducing solution A were reacted with each other in a water bath at 60° C. for 4.5 hours. The electrode is referred to as electrode B3.

Then, electrode A1 was exposed to ethanol several times to be washed, was dried at 70° C. in a vacuum for 10 hours, and was pressed at 120° C. so that the electrode density was approximately 2.0 g/cm$^2$. After that, resulting electrode A1 was stamped into a circular shape with a diameter of 12 mm. The obtained electrode was used as a positive electrode to fabricate a 2032-type coin battery; this battery is referred to as battery A1.

In battery A1, polypropylene (PP) was used as a separator; a lithium metal was used as a negative electrode; and an electrolytic solution formed in such a manner that lithium hexafluorophosphate (LiPF$_6$) was dissolved at a concentration of 1 M in a mixed solution in which ethylene carbonate (EC) and diethyl carbonate (DEC) were mixed at a volume ratio of 1:1 was used. Note that the active material content in the positive electrode was approximately 9 mg/cm$^2$.

Coin batteries using electrodes A2, B1, B2, and B3 were also fabricated in a manner similar to that of the coin battery using electrode A1. A coin battery using electrode A2 as a positive electrode is referred to as battery A2; a coin battery using electrode B1 as a positive electrode is referred to as battery B1; a coin battery using electrode B2 as a positive electrode is referred to as battery B2; and a coin battery using electrode B3 as a positive electrode is referred to as battery B3.

After being washed, the electrodes were observed. In electrodes A1 and B1, any deposit and the like were not seen and there were no irregularities after the washing. In contrast, in electrode A2, many white deposits were seen and color unevenness was visually observed. This result implies that the reducing solution was evaporated and thus air bubbles were generated. In electrode B2, a few white deposits were seen. Since the white deposits in electrode B2 were fewer than those in electrode A2, it is suggested that evaporation of the reducing solution was not sufficiently inhibited. In electrode B3, any deposit was not seen.

Since the boiling point of ethanol contained in the reducing solution is 78° C., evaporation of ethanol in a water bath at 60° C. presumably led to generation of air bubbles in the active material layer in electrode A2. Electrode A2 was wound around the bottle and the aluminum foil was further wound around electrode A2; therefore, the generated air bubbles remained adsorbed on the active material layer. This presumably hindered reduction of graphene oxide contained in the active material layer.

Figure 11A:
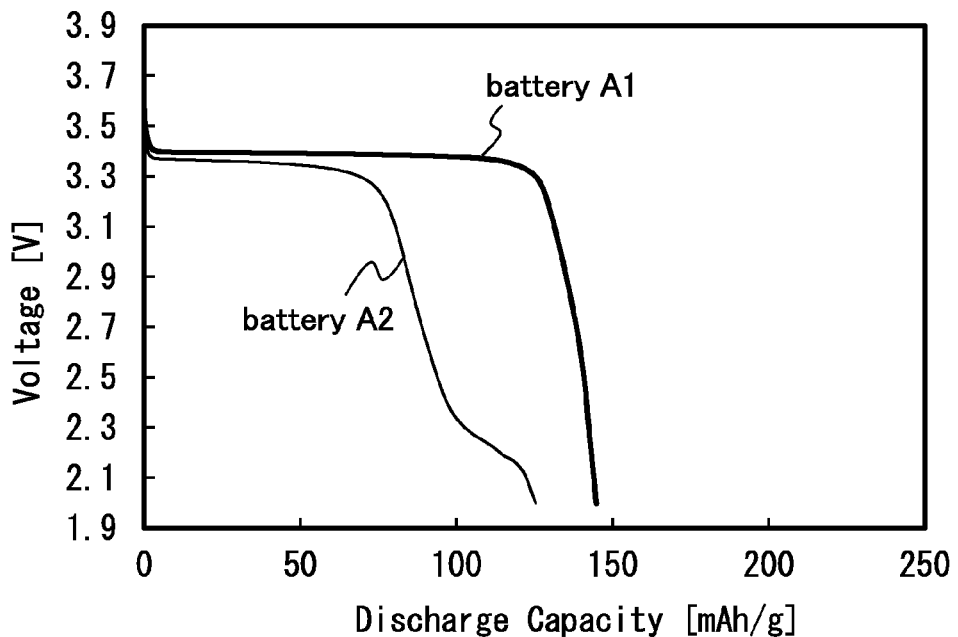
FIG. 11A is a graph showing discharge characteristics of batteries A1 and A2.
Figure 11B:
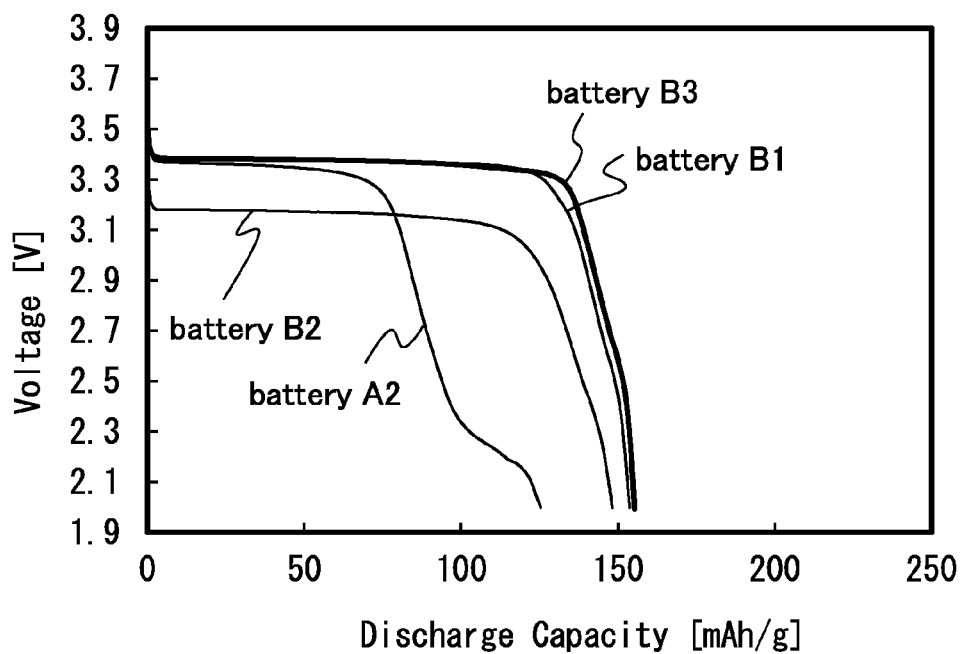
FIG. 11B is a graph showing discharge characteristics of batteries A2, B1, B2, and B3.

Next, FIGS. 11A and 11B show results obtained by measuring constant current discharge characteristics of batteries A1, A2, B1, B2, and B3. Note that a charge and discharge rate C refers to the rate at which a battery is charged and discharged and is represented by "current (A)÷ capacity (Ah)". For example, the charge and discharge rate in the case of charging and discharging a battery having a capacity of 1 Ah with 1 A is 1 C, and the charge and discharge rate in the case of charging and discharging the battery with 10 A is 10 C. The discharge rate for the measurement was 0.2 C (5 hours are required for discharge).

FIG. 11A is a graph showing the discharge characteristics of batteries A1 and A2, where the horizontal axis represents discharge capacity [mAh/g] and the vertical axis represents voltage [V]. FIG. 11B is a graph showing the discharge characteristics of batteries A2, B1, B2, and B3, where the horizontal axis represents discharge capacity [mAh/g] and the vertical axis represents voltage [V].

As shown in FIG. 11A, it is found by battery measurement that although capacity of battery A2 was finally obtained as a result of reduction of graphene oxide contained in electrode A2, enough capacity was not obtained in the first cycle. Thus, reduction of graphene oxide in electrode A2 of battery A2 did not proceed sufficiently as compared with that in electrode A1 of battery A1.

FIG. 11B shows that the capacity of battery B2 was higher than that of battery A2. This is probably due to a difference between the boiling points of the solvents contained in reducing solution A and reducing solution B. Although the temperature of the water bath of electrode A2 was 60° C., ethanol was likely to be evaporated and air bubbles were easily generated since the boiling point of ethanol in reducing solution A is 78° C. On the other hand, the boiling point of ethylene glycol in reducing solution B is 197° C., and the boiling point of water is 100° C. Thus, when the temperature of the water bath of electrode B2 was 60° C., generation of air bubbles was inhibited, which presumably facilitated reduction of graphene oxide.

As shown in FIG. 11B, capacity of battery B2 was observed in the first cycle, which suggests that reduction of graphene oxide in electrode B2 significantly proceeded. However, a deposit was observed in electrode B2, which implies that reduction of graphene oxide in electrode B2 less sufficiently proceeded than that in electrode B1 included in battery B1.

The capacity of battery B3 was higher than those of the other four batteries. This is presumably because electrode B3 was attached to the bottle and then the separator was wound around electrode B3, whereby air bubbles generated by evaporation of the reducing solution were able to be released to the outside. In this manner, air bubbles were probably inhibited from being left in the active material layer, facilitating reduction of graphene oxide. Thus, it is suggested that in electrode B3, graphene oxide was able to be reduced at a level higher than or equal to that of electrode A1 not wound around a bottle and subjected to reduction treatment.

The above results show that the storage battery including the electrode formed by the method for fabricating a storage battery electrode of one embodiment of the present invention had extremely favorable characteristics.

Example 2

In this example, descriptions will be given of results obtained by comparing the characteristics of batteries including a plurality of electrodes fabricated using different reducing solutions.

First, the electrodes fabricated in this example will be described.

First, NMP was added as a polar solvent to LiFePO$_4$ which was formed by a solid phase method and was not coated with carbon and to which graphene oxide was added, and the mixture was kneaded until it had the consistency of thick paste. After an NMP solution of PVDF (No. 1100 manufactured by KUREHA CORPORATION) was added as a binder to the mixture of graphene oxide and LiFePO$_4$, NMP was further added as a polar solvent and mixing was performed to form a slurry. The slurry formed by the above method was applied to a current collector formed by coating a 20-μm-thick aluminum film with approximately 1-μm-thick carbon black as an undercoat, and the slurry was dried at 80° C. in the air for 40 minutes. With the use of the above method, the plurality of electrodes in each of which an active material layer was formed over a current collector were fabricated.

Next, a plurality of reducing solutions used for reduction treatment were formed.

First, a diethylene glycol aqueous solution (containing diethylene glycol at 80 vol %) containing 77 mM ascorbic acid and 75 mM lithium hydroxide was prepared. This solution is referred to as reducing solution C.

Then, a triethylene glycol aqueous solution (containing triethylene glycol at 80 vol %) containing 77 mM ascorbic acid and 75 mM lithium hydroxide was prepared. This solution is referred to as reducing solution D.

Then, a propylene glycol aqueous solution (containing propylene glycol at 80 vol %) containing 77 mM ascorbic acid and 75 mM lithium hydroxide was prepared. This solution is referred to as reducing solution E.

Then, a 1-Methyl-2-pyrrolidone aqueous solution (containing 1-Methyl-2-pyrrolidone at 80 vol %) containing 77 mM ascorbic acid and 75 mM lithium hydroxide was prepared. This solution is referred to as reducing solution F.

Then, a dimethyl sulfoxide aqueous solution (containing dimethyl sulfoxide at 80 vol %) containing 77 mM ascorbic acid and 75 mM lithium hydroxide was prepared. This solution is referred to as reducing solution G.

Then, a 2-Ethoxyethanol aqueous solution (containing 2-Ethoxyethanol at 80 vol %) containing 77 mM ascorbic acid and 75 mM lithium hydroxide was prepared. This solution is referred to as reducing solution H.

Then, a diethylene glycol monoethyl ether aqueous solution (containing diethylene glycol monoethyl ether at 80 vol %) containing 77 mM ascorbic acid and 75 mM lithium hydroxide was prepared. This solution is referred to as reducing solution I.

The pH measurement results of the aqueous solution containing 77 mM ascorbic acid and 75 mM lithium hydroxide was pH 6 to 7.

The materials used in this example are as follows: ethylene glycol and diethylene glycol produced by KISHIDA CHEMICAL Co., Ltd.; propylene glycol, 1-Methyl-2-pyrrolidone, dimethyl sulfoxide, and diethylene glycol monoethyl ether produced by Tokyo Chemical Industry Co., Ltd.; and 2-Ethoxyethanol produced by KANTO CHEMICAL CO., INC. In addition, L-ascorbic acid (purity: 99.6%) produced by Wako Pure Chemical Industries, Ltd. was used.

One of the electrodes was put into a sufficiently large beaker containing reducing solution C, and the electrode and reducing solution C were reacted with each other at 60° C. for 30 minutes in a water bath. The obtained electrode is referred to as electrode C.

One of the electrodes was put into a sufficiently large beaker containing reducing solution D, and the electrode and reducing solution D were reacted with each other at 60° C. for 1 hour in a water bath. The electrode is referred to as electrode D.

One of the electrodes was put into a sufficiently large beaker containing reducing solution E, and the electrode and reducing solution E were reacted with each other at 60° C. for 1 hour in a water bath. The electrode is referred to as electrode E.

One of the electrodes was put into a sufficiently large beaker containing reducing solution F, and the electrode and reducing solution F were reacted with each other at 60° C. for 1 hour in a water bath. The electrode is referred to as electrode F.

One of the electrodes was put into a sufficiently large beaker containing reducing solution G, and the electrode and reducing solution G were reacted with each other at 60° C. for 1 hour in a water bath. The electrode is referred to as electrode G.

One of the electrodes was put into a sufficiently large beaker containing reducing solution H, and the electrode and reducing solution H were reacted with each other at 60° C. for 1 hour in a water bath. The electrode is referred to as electrode H.

The electrode using reducing solution I containing diethylene glycol monoethyl ether was discarded because the reaction between aluminum of the current collector and reducing solution I generated bubbles.

Further, electrode C was exposed to ethanol several times to be washed, was dried at 70° C. in a vacuum for 10 hours, and was pressed at 120° C. so that the electrode density was approximately 2.0 g/cm$^2$. After that, resulting electrode C was stamped into a circular shape with a diameter of 12 mm. The obtained electrode was used as a positive electrode to fabricate a coin battery; this battery is referred to as battery C1.

In battery C1, polypropylene (PP) was used as a separator; a lithium metal was used as a negative electrode; and an electrolytic solution formed in such a manner that lithium hexafluorophosphate (LiPF$_6$) was dissolved at a concentration of 1 M in a mixed solution in which ethylene carbonate (EC) and diethyl carbonate (DEC) were mixed at a volume ratio of 1:1 was used.

Coin batteries using electrodes D, E, F, G, and H were also fabricated in a manner similar to that of the coin battery using electrode C. A coin battery using electrode D1 as a positive electrode is referred to as battery D1; a coin battery using electrode E1 as a positive electrode is referred to as battery E1; a coin battery using electrode F1 as a positive electrode is referred to as battery F1; a coin battery using electrode G1 as a positive electrode is referred to as battery G1; and a coin battery using electrode H1 as a positive electrode is referred to as battery H1.

Here, the active material content in electrode C1 was 9.0 mg/cm$^2$, and the thickness of the active material layer was 47 μm. The active material content in electrode D1 was 9.0 mg/cm$^2$, and the thickness of the active material layer was 49 μm. The active material content in electrode E1 was 9.3 mg/cm$^2$, and the thickness of the active material layer was 50 μm. The active material content in electrode F1 was 9.0 mg/cm$^2$, and the thickness of the active material layer was 51 μm. The active material content in electrode G1 was 9.4 mg/cm$^2$, and the thickness of the active material layer was 50 μm. The active material content in electrode H1 was 8.9 mg/cm$^2$, and the thickness of the active material layer was 50 μm.

Figure 12:
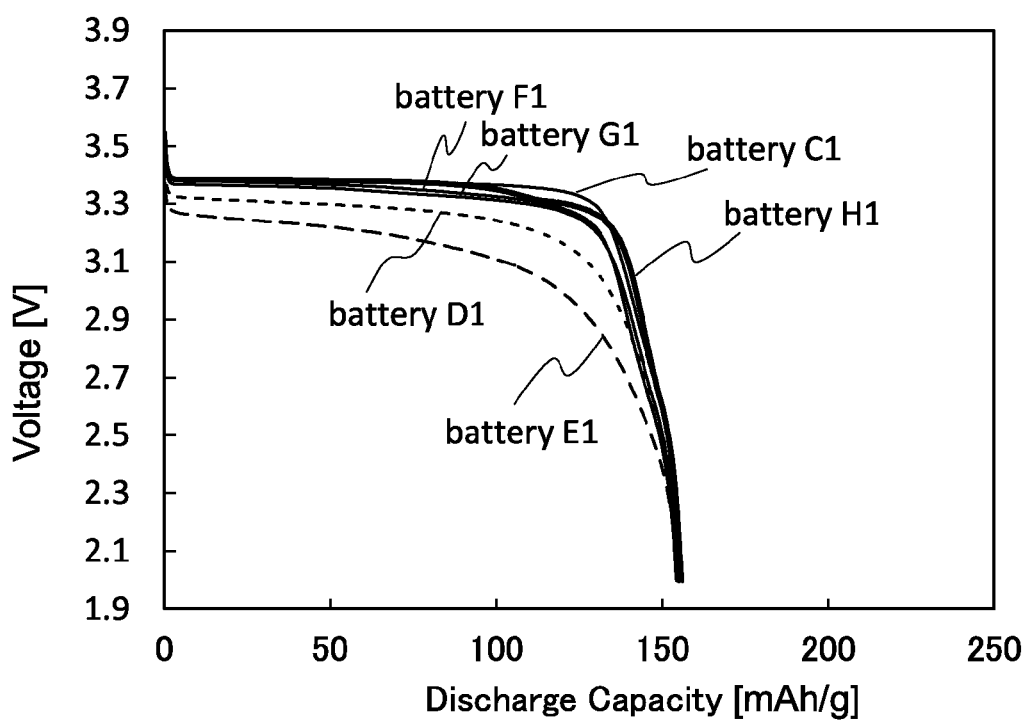
FIG. 12 is a graph showing discharge characteristics of batteries C1, D1, E1, F1, G1, and H1.

Next, FIG. 12 shows results obtained by measuring constant current discharge characteristics of batteries D1, E1, F1, G1, and H1.

FIG. 12 is a graph showing the initial charge and discharge characteristics of batteries D1, E1, F1, G1, and H1, where the horizontal axis represents discharge capacity [mAh/g] and the vertical axis represents voltage [V].

Table 1 shows the boiling points and the vicinities at 20° C. of the individual solvents used for the respective conditions.

TABLE 1

|  | Boiling point [° C.] | Viscosity [mPa · s] |
| --- | --- | --- |
| NMP | 202 | 1.0 |
| DMSO | 189 | 2.0 |
| EtOEtOH | 136 | 1.8 |
| diEthylene Glycol | 244 | 36 |
| triEthylene Glycol | 276 | 48 |
| Propylene Glycol | 187 | 56 |

The results shown in FIG. 12 suggest that the reducing solutions using triethylene glycol and propylene glycol each having a vicinity of higher than 40 mPa·s at room temperature hardly permeated the electrodes. On the other hand, no difference was observed between the reducing solution using diethylene glycol and the reducing solutions using ethanol and NMP each having low viscosity, it is suggested that the reaction rate does not depend on the permeability of the reducing solution as long as viscosity is lower than certain viscosity. The experiment was performed in the state where the reducing solution can permeate the electrode from its surface. Further, as shown in the results in Example 1, the reducing solution also permeated the electrode rolled up together with the spacer, from the surface of the electrode; thus, the state probably had similar tendency. In the case of the electrode rolled up without a spacer, the reducing solution permeates the electrode from side surfaces of the electrode and thus does not easily permeate it. This suggests that difficulty in reduction depends on viscosity as long as the viscosity is higher than a certain viscosity and does not depends on viscosity as long as the viscosity is lower than the certain viscosity.

Further, no significant difference in reduction time was observed between the solvents used for the experiment except ethylene glycol. It is suggested that the reaction rate depends on the presence of H$_2$O used as a cosolvent. In the case of ethylene glycol, the reduction reaction rate was exceptionally low, which is probably due to air oxidation. Therefore, it is presumed that the side reaction can be inhibited under an anaerobic atmosphere.

This application is based on Japanese Patent Application serial no. 2013-068003 filed with Japan Patent Office on Mar. 28, 2013, the entire contents of which are hereby incorporated by reference.

What is claimed is:

1. A method for manufacturing an electrode for a storage battery, the method comprising the steps of:
    forming a stack of an active material layer and a current collector;
    rolling up the stack of the active material layer and the current collector together with a porous support to form a rolled stack comprising the porous support after forming the stack of the active material layer and the current collector;
    immersing the rolled stack in a solution comprising a reducing agent after forming the rolled stack; and
    separating the porous support from the stack of the active material layer and the current collector.

2. The method according to claim 1, wherein the active material layer comprises graphene oxide.

3. The method according to claim 1, wherein the solution comprising the reducing agent further comprises water.

4. The method according to claim 3, wherein the solution comprising the reducing agent further comprises a solvent which has a higher boiling point than water.

5. The method according to claim 1, wherein the solution comprising the reducing agent further comprises a pH adjuster.

6. The method according to claim 1, further comprising the steps of:
    washing the active material layer after immersing the rolled stack; and
    drying the active material layer after the washing step.

7. The method according to claim 1, wherein the reducing agent is any one of materials selected from ascorbic acid, hydrazine, dimethyl hydrazine, hydroquinone, sodium boron hydride, tetra butyl ammonium bromide, $LiAlH_4$, N,N-diethylhydroxylamine and a derivative thereof.

8. The method according to claim 1, wherein the active material layer comprises a positive electrode active material.

9. A method for manufacturing an electrode for a storage battery, the method comprising the steps of:
    applying a slurry which comprises an active material and graphene oxide to a current collector;
    drying the slurry to form a stack of an active material layer and the current collector;
    rolling up the stack of the active material layer and the current collector together with a porous support to form a rolled stack comprising the porous support after forming the stack of the active material layer and the current collector;
    immersing the rolled stack in a solution comprising a reducing agent after forming the rolled stack; and
    separating the porous support from the stack of the active material layer and the current collector.

10. The method according to claim 9, wherein the graphene oxide is reduced by the immersion step so that graphene is formed.

11. The method according to claim 9, wherein the solution comprising the reducing agent further comprises water.

12. The method according to claim 11, wherein the solution comprising the reducing agent further comprises a solvent which has a higher boiling point than water.

13. The method according to claim 9, wherein the reducing agent is any one of materials selected from ascorbic acid, hydrazine, dimethyl hydrazine, hydroquinone, sodium boron hydride, tetra butyl ammonium bromide, $LiAlH_4$, N,N-diethylhydroxylamine and a derivative thereof.

14. The method according to claim 13, wherein the reducing agent is ascorbic acid.

15. The method according to claim 9, further comprising the steps of:
    washing the active material layer after immersing the rolled stack; and
    drying the active material layer after the washing step.

16. The method according to claim 15, wherein the washing step is performed by spraying a washing solution.

17. The method according to claim 9, wherein the active material layer comprises a positive electrode active material.

18. A method for manufacturing an electrode for a storage battery, the method comprising the steps of:
    applying a slurry which comprises an active material and graphene oxide to a current collector;
    drying the slurry to form a stack of an active material layer and the current collector;
    rolling up the stack of the active material layer and the current collector to form a rolled stack after forming the stack of the active material layer and the current collector;
    immersing the rolled stack in a solution comprising a reducing agent to reduce graphene oxide after forming the rolled stack;
    washing the stack of the active material layer and the current collector after immersing the rolled stack; and
    drying the stack of the active material layer and the current collector after the washing step,
    wherein the solution comprising the reducing agent further comprises water and a solvent which has a higher boiling point than water.

19. The method according to claim 18, wherein the reducing agent is any one of materials selected from ascorbic acid, hydrazine, dimethyl hydrazine, hydroquinone, sodium boron hydride, tetra butyl ammonium bromide, $LiAlH_4$, N,N-diethylhydroxylamine and a derivative thereof.

20. The method according to claim 18, wherein the active material layer comprises a positive electrode active material.

21. The method according to claim 18, wherein the solution comprising the reducing agent further comprises a pH adjuster.

* * * * *